US012652301B2

(12) United States Patent
Lai et al.

(10) Patent No.: US 12,652,301 B2
(45) Date of Patent: Jun. 9, 2026

(54) MULTI-PROCESS SHARED-MEMORY MESSAGE COMMUNICATION

(71) Applicant: Palo Alto Networks, Inc., Santa Clara, CA (US)

(72) Inventors: Weiming Lai, Fremont, CA (US); Xin Luo, Fremont, CA (US); Ho Yu Lam, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 190 days.

(21) Appl. No.: 18/101,284

(22) Filed: Jan. 25, 2023

(65) Prior Publication Data

US 2024/0250970 A1 Jul. 25, 2024

(51) Int. Cl.
*H04L 9/40* (2022.01)
*G06F 3/06* (2006.01)
*G06N 20/20* (2019.01)

(52) U.S. Cl.
CPC ........ *H04L 63/1425* (2013.01); *G06F 3/0611* (2013.01); *G06F 3/0659* (2013.01);
(Continued)

(58) Field of Classification Search
CPC ............. H04L 63/1425; H04L 63/1416; H04L 63/1408; H04L 63/1466; H04L 63/1441; H04L 63/14; H04L 63/126; H04L 63/123; G06F 3/0611; G06F 3/0659; G06F 3/067; G06N 20/20
See application file for complete search history.

(56) References Cited

U.S. PATENT DOCUMENTS 8,375,450 B1 2/2013 Oliver
8,661,547 B1 2/2014 Kononov
(Continued)

FOREIGN PATENT DOCUMENTS

CN 119563303 3/2025

OTHER PUBLICATIONS

ACM—Association for Computing Machinery, IWCTS 2009, Proceedings of The Second International Workshop on Computational Transportation Science in Conjunction with ACM SIGSPATIAL GIS 2009, Nov. 3, 2009.
(Continued)

*Primary Examiner* — Alexander Lagor
*Assistant Examiner* — Taylor P Vu
(74) *Attorney, Agent, or Firm* — Van Pelt, Yi & James LLP

(57) ABSTRACT
The present application discloses a method, system, and computer system for using a shared memory quota for communicating with a plurality of services in a data plane. The method includes processing a set of data for network security analysis, determining whether to offload the set of data to a cloud security entity for security processing, in response to determining to offload the set of data to the cloud security entity, send the set of data from a shared memory of the inline security entity to the cloud security entity. The cloud security entity provides a plurality of services. The plurality of services share a multiple-service shared-memory in which messages pertaining to the set of data offloaded to the cloud security entity is stored. Each service in the plurality of services is allocated a quota of the multiple-service shared-memory.

25 Claims, 15 Drawing Sheets

(52) U.S. Cl.
CPC ............. *G06F 3/067* (2013.01); *G06N 20/20*
(2019.01); *H04L 63/1416* (2013.01)

(56) References Cited

U.S. PATENT DOCUMENTS

| | | | |
|---|---|---|---|
| 9,043,894 B1 | 5/2015 | Dennison | |
| 9,756,061 B1* | 9/2017 | Roeh ................... | H04L 63/1408 |
| 9,805,193 B1 | 10/2017 | Salsamendi | |
| 9,894,578 B1 | 2/2018 | Jawaharlal | |
| 10,169,579 B1 | 1/2019 | Xu | |
| 10,225,137 B2 | 3/2019 | Jain | |
| 10,452,993 B1 | 10/2019 | Hart | |
| 10,897,480 B2 | 1/2021 | Grubel | |
| 11,323,454 B1 | 5/2022 | Li | |
| 11,468,185 B2 | 10/2022 | Hayes | |
| 11,611,571 B2 | 3/2023 | Lindquist | |
| 11,818,134 B1 | 11/2023 | Gibson | |
| 11,880,460 B2 | 1/2024 | Sevcenko | |
| 12,067,115 B2 | 8/2024 | Kulaga | |
| 12,346,236 B2 | 7/2025 | Yamato | |
| 2013/0347075 A1 | 12/2013 | Narendra | |
| 2014/0105103 A1 | 4/2014 | Nethi | |
| 2014/0189267 A1* | 7/2014 | Qi ......................... | G06F 16/128 |
| | | | 711/158 |
| 2014/0280940 A1 | 9/2014 | Chapman | |
| 2014/0334495 A1 | 11/2014 | Stubberfield | |
| 2015/0134485 A1 | 5/2015 | Kim | |
| 2015/0341230 A1 | 11/2015 | Dave | |
| 2015/0341235 A1* | 11/2015 | Ni ........................... | H04L 43/16 |
| | | | 370/392 |
| 2016/0019636 A1 | 1/2016 | Adapalli | |
| 2016/0373325 A1* | 12/2016 | Shanks ................. | H04L 43/028 |
| 2017/0310703 A1* | 10/2017 | Ackerman .......... | H04L 63/1416 |
| 2018/0115525 A1 | 4/2018 | Chou | |
| 2018/0324201 A1* | 11/2018 | Lowry ................ | H04L 63/1441 |
| 2020/0076835 A1* | 3/2020 | Ladnai ................ | H04L 63/0263 |
| 2020/0099549 A1 | 3/2020 | Gummadidala | |
| 2020/0210581 A1 | 7/2020 | Salsamendi | |
| 2020/0259792 A1* | 8/2020 | Devarajan .......... | H04L 63/1416 |
| 2021/0060426 A1 | 3/2021 | Baca | |
| 2021/0158199 A1* | 5/2021 | Heckey ............... | G06F 9/45558 |
| 2021/0382808 A1* | 12/2021 | Zhang ................. | G06F 11/3006 |
| 2022/0006805 A1 | 1/2022 | Kulkarni | |
| 2022/0014602 A1 | 1/2022 | Sai Sampath | |
| 2022/0067146 A1 | 3/2022 | Cai | |
| 2022/0103525 A1 | 3/2022 | Shribman | |
| 2022/0131879 A1* | 4/2022 | Naik ................... | H04L 63/1416 |
| 2022/0155992 A1* | 5/2022 | Nortman ................ | G06F 9/544 |
| 2022/0239508 A1 | 7/2022 | Liu | |
| 2022/0318097 A1* | 10/2022 | Quan .................... | G06F 3/0644 |
| 2022/0374294 A1* | 11/2022 | van der Merwe .... | G06F 9/4812 |
| 2022/0417332 A1 | 12/2022 | Chiganmi | |
| 2023/0039584 A1* | 2/2023 | Luo ....................... | H04L 63/101 |
| 2023/0110404 A1 | 4/2023 | Raj Susairaju | |
| 2023/0125134 A1* | 4/2023 | Raleigh .................. | H04L 47/20 |
| | | | 455/410 |
| 2023/0169181 A1 | 6/2023 | Bargury | |
| 2023/0300114 A1* | 9/2023 | Bhallamudi ........... | H04L 63/10 |
| | | | 726/6 |
| 2024/0040378 A1 | 2/2024 | John Thomas | |
| 2024/0152401 A1* | 5/2024 | Naseem ................. | G06F 9/505 |
| 2024/0196191 A1 | 6/2024 | Lu | |
| 2024/0250970 A1 | 7/2024 | Lai | |
| 2024/0291816 A1 | 8/2024 | Hulick | |
| 2025/0117482 A1 | 4/2025 | Timothy | |
| 2025/0141886 A1 | 5/2025 | Lai | |
| 2025/0141894 A1 | 5/2025 | Yang | |
| 2025/0193250 A1 | 6/2025 | Patnala | |

OTHER PUBLICATIONS

Inagaki et al., Prioritization of Mobile IoT Data Transmission Based on Data Importance Extracted From Machine Learning Model, Special Section on Intelligent and Cognitive Techniques for Internet of Things, IEEE Access, vol. 7, 2019, pp. 93611-93620.

Saeed et al., Towards Optimizing WLANs Power Saving: Novel Context-Aware Network Traffic Classification Based on a Machine Learning Approach, IEEE Access, vol. 7, 2019, pp. 3122-3135.

Shinkuma et al., Data Assessment and Prioritization in Mobile Networks for Real-Time Prediction of Spatial Information using Machine Learning, EURASIP Journal on Wireless Communications and Networking, 2020, pp. 1-19.

* cited by examiner

400

500

550

650

700

800

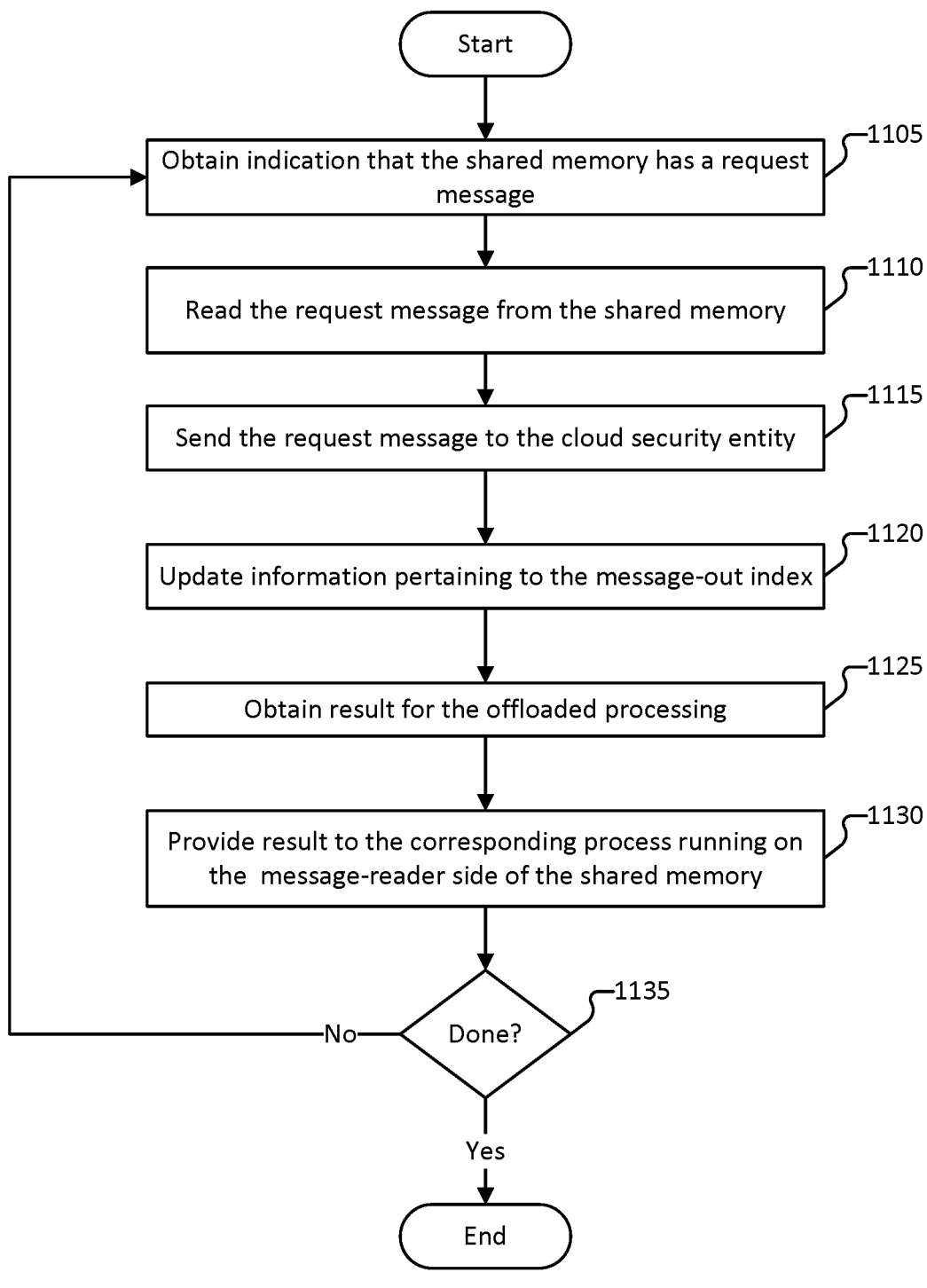

Start

Obtain indication that the shared memory has a request message ⟍1105

Read the request message from the shared memory ⟍1110

Send the request message to the cloud security entity ⟍1115

Update information pertaining to the message-out index ⟍1120

Obtain result for the offloaded processing ⟍1125

Provide result to the corresponding process running on the message-reader side of the shared memory ⟍1130

No — Done? ⟍1135

Yes

End

MULTI-PROCESS SHARED-MEMORY MESSAGE COMMUNICATION

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm. Techniques for detecting malware may be performed locally by a firewall or via a cloud service.

BRIEF DESCRIPTION OF THE DRAWINGS

Various embodiments of the invention are disclosed in the following detailed description and the accompanying drawings.

FIG. 11 is a flow diagram of a method for offloading processing of a set of data to a cloud security entity according to various embodiments.

DETAILED DESCRIPTION

Figure 1:
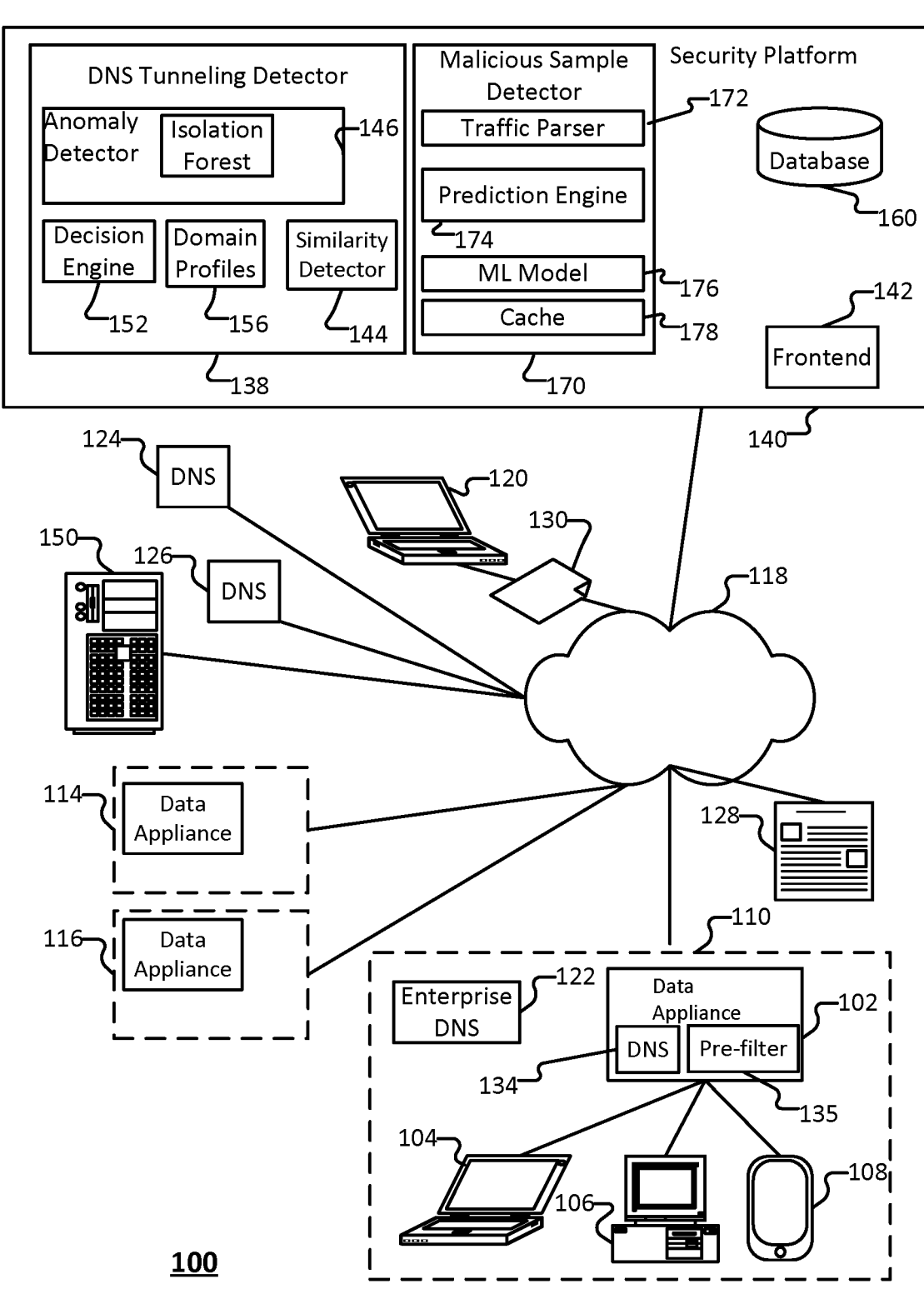
FIG. 1 is a block diagram of an environment in which a malicious traffic is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, an inline security entity may include a network node (e.g., a device) that enforces one or more security policies with respect to information such as network traffic, files, etc. As an example, a security entity may be a firewall. As another example, an inline security entity may be implemented as a router, a switch, a DNS resolver, a computer, a tablet, a laptop, a smartphone, etc. Various other devices may be implemented as a security entity. As another example, an inline security entity may be implemented as an application running on a device, such as an anti-malware application. As another example, an inline security entity may be implemented as an application running on a container or virtual machine.

According to some related art systems, a task is communicated to another system (e.g., a cloud system/service) via a management plane. A cloud service generally has more resources and greater processing power. Thus, local systems are designed to offload as much information or tasks to the cloud service as possible. For example, local systems are designed to offload to a cloud service the heavy compute process activities. The local system may perform low latency services but will offload as much processing as possible to the cloud service. The related art local system comprises a data plane on which a plurality of applications is running and a management plane that facilitates communications between the plurality of applications and another system, such as a cloud service. Such related art systems are inefficient because the management plane serves as a bottleneck. For each communication between the related art system and the cloud system, the data plane of the related art system sends a communication (e.g., the task) to the management plane, which in turn sends the communication to the cloud system. Thus, the communication of the task from the related art system to the cloud system requires two communications/hops.

To solve the inefficiencies of the related art systems that mediate communications between the data plane of a local system and a cloud service to which the process running on the data plane offloads information or tasks, other related art systems include a shared memory to facilitate inter-process communications (e.g., communication of messages, such as messages corresponding to tasks). A plurality of tasks (e.g., applications) running on the system use a shared memory, such as to communicate with another process (e.g., a daemon running on a data plane of the system to facilitate communication with another system, such as a cloud service). For example, the plurality of tasks respectively writes request messages to a shared memory, and the daemon retrieves the request message and communicates with the cloud service. As another example, in response to receiving a response message (also referred to herein as a result message), the daemon writes the response message to the shared memory and the applicable task may read the response message from the shared memory. Some related art systems may comprise a forward-direction shared memory and a reverse direction shared memory for facilitating communication of data (e.g., messages) from the data plane of the local system to the other system (e.g., the cloud service).

As used herein, a forward direction shared memory may include a memory in which messages (e.g., request messages) are written by one or more of the applications for reading by a process (e.g., a daemon, also referred to herein as the WIFClient) running on a data plane of the system on which the plurality of applications is executed (e.g., an inline security entity). The process (e.g., the daemon) may be responsible for transferring the messages from the system (e.g., the messages generated by the plurality of applications) to a cloud system (e.g., a cloud security entity), and to receive the verdict (e.g., a result of the message from the cloud system and provide the verdict to the corresponding application of the plurality of application (e.g., the application that wrote the message to the forward direction shared memory).

As used herein, a reverse direction shared memory may include a memory in which messages (e.g., result message) are written by the process running on the data plane of the system on which the plurality of applications is executed (e.g., the inline security entity). The process may be responsible for receiving the verdict (e.g., a result of the message from the cloud system and provide the verdict to the corresponding application of the plurality of application (e.g., the application that wrote the message to the forward direction shared memory). The process provides the verdict to the corresponding application by writing a corresponding message to the reverse direction shared memory, and the corresponding application may receive the verdict based on a reading of the reverse direction shared memory.

According to various embodiments, the plurality of applications may be written or compiled in different programming languages. At least a subset of the plurality of applications provides corresponding local services at a system (e.g., an inline security entity), and the local services are configured to offload tasks to a cloud service (e.g., a cloud system that provides a plurality of corresponding cloud services). For example, tasks that write request messages to the shared memory (e.g., the forward-direction shared memory) may be written in C, and the application that retrieves the request message from the shared memory and facilitates communication with the cloud service may be written in Go programming language (also referred to herein as golang). The use of a shared memory in connection with communicating requests from the data plane to the cloud service provides a more seamless manner for passing messages from applications written in a first language to applications written in a second language. For example, developers are freed from having to develop interfaces by which the applications communicate with one another.

Because a plurality of local services (e.g., running at the inline security entity) write tasks (e.g., request messages) to the multi-application shared-memory (e.g., the forward-direction shared memory), the memory constraints of the shared-memory can cause the process (e.g., the application) that retrieves the request message from the shared memory and facilitates communication with the cloud service to be overloaded. According to various embodiments, the system enforces a quota for data that a particular local service can write to the shared memory. Each local service may have its own corresponding quota, or various subsets of local services may be grouped and share a group quota for the particular group/subset of local services.

Various embodiments include a system, method, and device for multi-application processing. In some embodiments, the multi-application processing includes security processing at an inline security entity. The method includes processing a set of data for network security analysis, determining whether to offload the set of data to a cloud security entity for security processing, and in response to determining to offload the set of data to the cloud security entity, send the set of data from a shared memory of the inline security entity to the cloud security entity. The cloud security entity provides a plurality of first services (e.g., cloud services) for a plurality of second services (e.g., local services) running on the inline security entity. The plurality of second services (e.g., local services running at the inline security entity) share a multiple-service shared-memory in which messages pertaining to the set of data offloaded to the cloud security entity is stored. One or more of the plurality of local services is allocated a quota of the multiple-service shared-memory.

Various embodiments include a system, method, and device for multi-application processing. The method includes processing, by a first system, a set of data, determining whether to offload the set of data to a second system (e.g., a cloud service) for processing, and in response to determining to offload the set of data to the second system, send the set of data from a shared memory of the first system entity to the cloud security entity. The cloud security entity provides a plurality of first services (e.g., cloud services) for a plurality of second services (e.g., local services) running on the inline security entity. The plurality of second services (e.g., local services running at the inline security entity) share a multiple-service shared-memory in which messages pertaining to the set of data offloaded to the cloud security entity is stored. One or more of the plurality of local services is allocated a quota of the multiple-service shared-memory.

Examples of services provided by the cloud service (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), an Internet of Things (IOT) service. Various other services may be implemented.

In some embodiments, an inline security entity has a plurality of processes (e.g., tasks, applications, etc.) running thereon, which respectively correspond to services provided by the cloud service entity. For example, each service running on the cloud service entity corresponds to (e.g., services) a service running at the inline security entity. The inline security entity determines whether to offload processing of certain data to the cloud service entity. For example, the inline security entity determines an extent to which data processing is to be performed locally or offloaded for processing to the cloud service entity. The inline security entity is configured to perform low latency services, and offloads processing for compute intensive services (e.g., if processing data is to exceed a predefined processing threshold, the processing is offloaded; or if the type of processing data matches processing that is mapped to the cloud service entity, the processing is offloaded; etc.). In response to determining to offload processing certain data to the cloud service entity, the service running on the inline security entity writes a message (e.g., a request for the data to be processed by the cloud service entity) to the multi-application shared memory.

In some embodiments, the multi-application shared memory(ies) (e.g., the forward direction shared memory, the reverse direction shared memory, etc.) is a ring buffer.

According to various embodiments, one or more data planes of the inline security entity are configured to communicate with the cloud service. For example, a data plane communicates directly with the cloud service entity, or otherwise communicates with the cloud service entity in a manner that does not require the management plane to communicate data processing requests (e.g., request messages) to the cloud service entity. The system thus reduces latency by relying on the data plane to connect to cloud.

The inline security entity receives data from another system or service. For example, the inline security entity comprises/corresponds to a firewall that mediates traffic across a network. In some embodiments, the inline security entity has a cache that may be used to support inline processing (e.g., local processing at the inline security entity) of the data (e.g., the traffic data). For example, the system may use the cache in connection with storing models, previously detected patterns/fingerprints, or other store results from processing traffic such as results previously computed inline, or verdicts (e.g., results) received from the cloud service entity. In response to receiving data, the system (e.g., the inline security entity) queries its cache to determine whether the cache has sufficient information available for the system to perform local processing of the data (e.g., low-latency computes with respect to such data). For example, the system determines whether the cache stores a mapping (e.g., a blacklist) of fingerprint (or hash) to malicious files (or malicious traffic) that includes the characteristics of the data received and being locally analyzed by the system. As another example, the system determines whether the cache stores a mapping (e.g., a whitelist) of fingerprint (or hash) to benign files (or malicious traffic) that includes the characteristics of the data received and being locally analyzed by the system. If the mapping(s) in the cache do not store a fingerprint for the data being analyzed, the system determines whether to offload processing (e.g., analysis of whether the traffic is malicious) to the cloud service. In some embodiments, the determination of whether to offload processing to the cloud service is performed at the data plane(s) of the system (e.g., the inline security entity), and the tasks running on the data plane(s) connect to the cloud service to request the service and receive the verdict.

In response to receiving the request message from the data plane of the local system, a process running on the cloud-side architecture determines the service that the request message pertains to. For example, the cloud service determines the service/processing to be performed at the cloud service based on the request message (e.g., the task/process from which the request message originated). The cloud service may determine the service/processing to be performed based on the connector (e.g., the connection interface between the data plane(s) of the local system and the cloud service) via which the request message was received. In response to determining the service/processing to be performed with respect to data for the request message, the cloud service obtains the data, allocates the processing to a worker, and the worker connects to a back-end service to perform the processing. In response to the processing being completed by the cloud service, the cloud service sends a verdict of the processing to the other system (e.g., the inline security entity). The verdict may be a result or response message corresponding to the request message. In some embodiments, the cloud security entity sends to the inline security entity an update for the inline security entity to store in its cache. For example, the cloud security entity sends to the inline security entity a signature for the data that was processed and a corresponding verdict (e.g., an indication of whether the data is malicious traffic or benign traffic, etc.). Upon update of the cache at the inline security entity, the inline security entity may use such information in connection with processing subsequent data (e.g., traffic) matching the signature associated with the update.

In some embodiments, the system comprises a plurality of shared memories. For example, the system comprises a first buffer that provides an indication of whether a message (e.g., a request message) is available for processing, and a second buffer that provides a message queue. The system uses indexes for the shared memories in connection with flow control, such as to ensure that the reader side (e.g., the daemon running on the data plane and facilitating communication with the cloud system) is not overwhelmed by request messages from the plurality of applications running on the data plane(s). The flow control of messages/requests may be facilitated by using metadata counters.

In connection with the process/task (e.g., the message writer) requesting service from the cloud system writing a request message into the shared memory, the system increases a message-in index (e.g., the write index) counter. The system uses the message-in index counter in connection with determining whether a request message is to be written into the shared memory or whether the message-reader side is overwhelmed with volume of requests from the processes/ tasks (e.g., applications) that share the shared memory. For example, if the message-reader side is too slow in processing the request messages, the buffer of requests messages in the queue may become full/used up. The write index indicates the total number of messages in the buffer.

In connection with processing the request messages written to the shared memory, the system increases a message-out index (e.g., the read index) counter in response to the process on the reader-side of the shared memory (e.g., the daemon, such as the WIFClient) reading the request message. For example, the reading of the request message by the process on the message-reader side is deemed to be indicative of the system having processed the request message and offloaded the processing to the cloud system. The system uses the message-out index counter in connection with determining whether a request message is to be written into the shared memory or whether the message-reader side is overwhelmed with volume of requests from the processes/tasks (e.g., applications) that share the shared memory.

In some embodiments, the system uses the message-out index counter and the message-in index counter to determine whether to process a particular request message. For example, the system uses the message-out index counter and the message-in index counter to determine whether to write the particular request message to the buffer (e.g., the shared memory). The system may compare the message-out index counter and the message-in index counter to determine whether the buffer has sufficient capacity for new request messages. For example, if the difference between the message-in index counter and the message-out index counter is greater than the allocated shared memory (or greater than the number of messages that can be written to the allocated shared memory), then the system (e.g., the message writer task/process) does not write the new request message to the shared memory or the system does not provide or otherwise blocks the corresponding service.

In some embodiments, the various processes (e.g., applications, services, etc.) running on the system that share the shared memory have quotas indicating an amount/number of request messages that the various processes that the various processes are permitted to have pending in the shared buffer. In some embodiments, each of the plurality of processes have corresponding quota. In some embodiments, a subset of the plurality of processes are grouped, and each group has a corresponding quota shared among the processes in the particular group. The system stores a message-in index and a message out index for each process (or group of processes, as applicable). In connection with writing a new request message to the shared memory, the system obtains the message-in index counter and the message-out index counter for the particular process (or group of processes, as applicable) requesting the service (e.g., requesting to offload the processing to the cloud service) and determines whether the allocated space in the shared memory for the process (e.g., the number of messages that may be written to the shared memory based on the corresponding quota) has sufficient space for the new request message. For example, the system determines the allocated space in the shared memory for a particular process based at least in part on multiplying a predefined number of available spaces for request messages by the quota corresponding to the particular process (or group of processes, as applicable). If the difference between the message-in index counter and the message-out index counter is greater than the product of the available spaces for request messages and the corresponding quota for the particular process, then the allocated space in the shared memory does not have sufficient capacity for new request messages until the message-reader side processes (e.g., reads out) the request messages (e.g., sends the requests to the cloud system for processing). In some implementations, in response to determining that the allocated space in the shared memory does not have sufficient capacity for new request messages, the system restricts writing of new request messages (e.g., the process is controlled to not write a new request message to the shared memory, or a corresponding service is blocked).

In some embodiments, the quotas respectively allocated to various processes sharing the shared memory are different. For example, certain services (e.g., certain processes/applications) may have higher quotas than other services. As an illustrative example, services that process streams of data (e.g., services for which a flow of traffic should not be disrupted), such as DLP services, may have a higher quota than other services. In some embodiments, a DLP service is provide a quota of 50% of the shared memory, and the other 50% of the shared memory is allocated across other services running on the inline security entity.

In some embodiments, the system dynamically adjusts quotas for one or more services (or group of services, as applicable). For example, the system monitors usage of the services and determines whether a particular service has excess or insufficient capacity relative to its usage and adjusts the quota for the particular service accordingly. If the system determines that a particular service has insufficient capacity in the shared memory, the system may determine whether another service has excess capacity which may be re-allocated to the particular service. If the system determines that a particular service has excess capacity in the shared memory relative to its usage, the system determines whether to re-allocate the excess capacity to another service. The system may monitor usage of a service based on monitoring traffic for the service or monitoring the usage of allocated space in the shared memory by the service.

Various embodiments use indexing associated with the shared memory to determine the number of buffered requests pending for the message-reader side (e.g., the daemon running on a data plane of the inline security entity and facilitating communication/offloading of requests to a cloud system). For example, the system uses the indexing to determine how much of the buffer (e.g., how many request messages) have not been consumed by the message-reader side process.

FIG. 1 is a block diagram of an environment in which a malicious traffic is detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is an inline security entity. Data appliance performs low-latency processing/analysis of incoming data (e.g., traffic data) and determines whether to offload any processing of the incoming data to a cloud system, such as security platform 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 may be a cloud system such as a cloud service security entity. Security platform 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, system 100 uses security platform 140 to perform processing with respect to traffic data off-loaded by data appliance 102. Security platform 140 provides one or more services to data appliance 102, client device 120, etc. Examples of services provided by security platform 140 (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), an Internet of Things (IOT) service. Various other services may be implemented.

In some embodiments, system 100 (e.g., malicious sample detector 170, security platform 140, etc.) trains a detection model to detect exploits (e.g., malicious samples), malicious traffic, or application identifies. Security platform 140 may store blacklists, whitelists, etc. with respect to data (e.g., mappings of signatures to malicious files, etc.). In response to processing traffic data, security platform 140 may send an update to inline security entities, such as data appliance 102. For example, security platform 140 provides an update to a mapping of signatures to malicious files, an update to a mapping of signatures to benign files, etc.

According to various embodiments, the model(s) trained by system 100 (e.g., security platform 140) is obtained using a machine learning process. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) is a combined feature vector or set of features vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security platform 140 comprises DNS tunneling detector 138 and/or malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors correspond-ing to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample are malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security platform 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176, an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security platform 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a blacklist of samples (e.g., corresponding to malicious samples) such as in the case that the received sample is deemed to be malicious, or an update to a whitelist of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query a whitelist and/or a blacklist). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a blacklist, a whitelist, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on a whitelist or blacklist, etc.). Malicious sample detector 170 (e.g., traffic parser 172) may detect that a sample is newly analyzed in response to security platform 140 receiving the sample from a security entity (e.g., a firewall) or endpoint within a network. For example, malicious sample detector 170 determines that a sample is newly analyzed contemporaneous with receipt of the sample by security platform 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample that is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes, characteristics, relationships among attributes or characteristics for the sample and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security platform 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140) and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138 such as decision engine 152 of DNS tunnelling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to resolve an SQL statement or SQL command, or other command injection string, data appliance 102 uses the corresponding sample (e.g., an input string) as a query to a local cache and/or security platform 140. This query can be performed concurrently with resolution of the SQL statement, SQL command, or other command injection string. As one example, data appliance 102 sends a query (e.g., in the JSON format) to a frontend 142 of security platform 140 via a REST API. As another example, data appliance 102 sends the query to security platform 140 (e.g., a frontend 142 of security platform 140) directly from a data plane of data appliance 102. For example, a process running on data appliance 102 (e.g., a daemon, such as the WIFClient, running on the data plane to facilitate offloading of processing data) communicates the query (e.g., request message) to security platform 140 without the query being first communicated to the message plane of data appliance 102, which in turn would communicate the query to security platform 140. For example, data appliance 102 is configured to use a process running on a data plane to query security platform 140 without mediation via a management plane of data appliance 102. Using processing described in more detail below, security platform 140 will determine (e.g., using malicious sample detector 170) whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. This query can be performed contemporaneously with receipt of the file or input string, or in response to a request from a user to scan the file. As one example, data appliance 102 can send a query (e.g., in the JSON format) to a frontend 142 of security platform 140 via a REST API. The query can be communicated to security platform by a process/connector implemented on a data plane of data appliance 102. Using processing described in more detail below, security platform 140 will determine (e.g., using a malicious file detector that may be similar to malicious sample detector 170 such as by using a machine learning model to detect/predict whether the file is malicious) whether the queried file is a malicious file (or likely to be a malicious file) and provide a result back to data appliance 102 (e.g., "malicious file" or "benign file").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo-.com)=[mail.foo.com,        coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh318y35.legitimatesite.com, xxx888222000444.otherlegitimatesite.com), such DNS patterns are highly unlikely to be misclassified as malicious tunneling. The following are example characteristics that can be extracted as features (e.g., into a feature vector) for a given group of domains (i.e., sharing a root domain).

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

In some embodiments, one or more feature vectors corresponding to the sample, such as a file, an input string, etc., are determined by system 100 (e.g., security platform 140, malicious sample detector 170, pre-filter 135, etc.). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, system 100 uses features associated with classifier of malicious sample detector 170 (e.g., machine learning model 176 such as the detection model, etc.) the one or more attributes associated with the sample in connection with determining the one or more feature vectors. In some implementations, pre-filter 135 determines a combined feature vector based at least in part on the one or more feature vectors corresponding to the sample. As an example, a set of one or more feature vectors is determined (e.g., set or defined) based at least in part on the pre-filter model (e.g., based on the pre-filter features). System 100 (e.g., pre-filter 135) can use the set of one or more feature vectors to determine the one or more attributes of patterns that are to be used in connection with training or implementing the model (e.g., attributes for which fields are to be populated in the feature vector, etc.). The pre-filter model may be trained using a set of features that are obtained based at least in part on the set of features used in connection with obtaining the detection model.

Figure 2A:
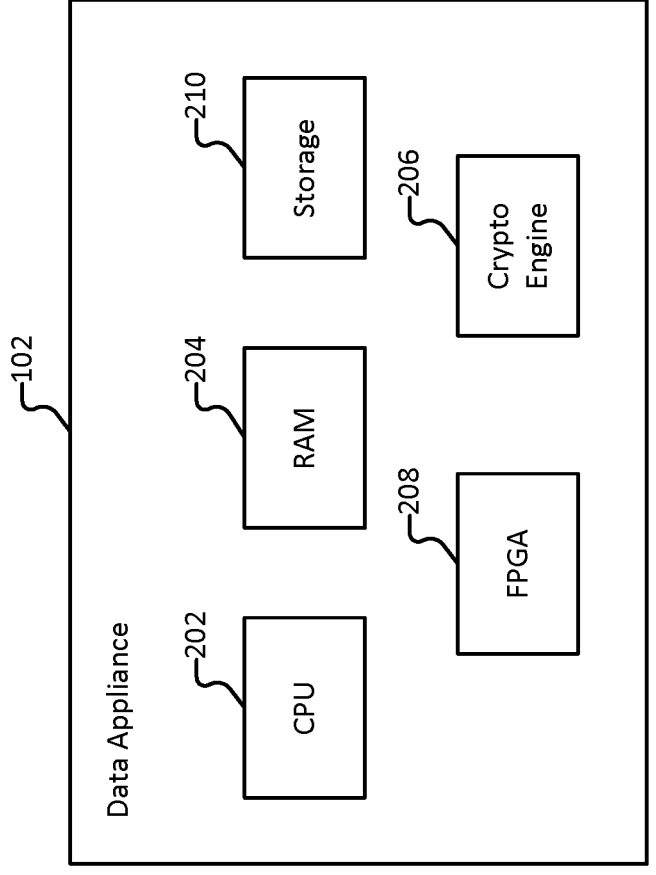
FIG. 2A illustrates an embodiment of a data appliance.

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing Social Networking; Web Browsing—News; SSH; and so on.

Figure 2B:
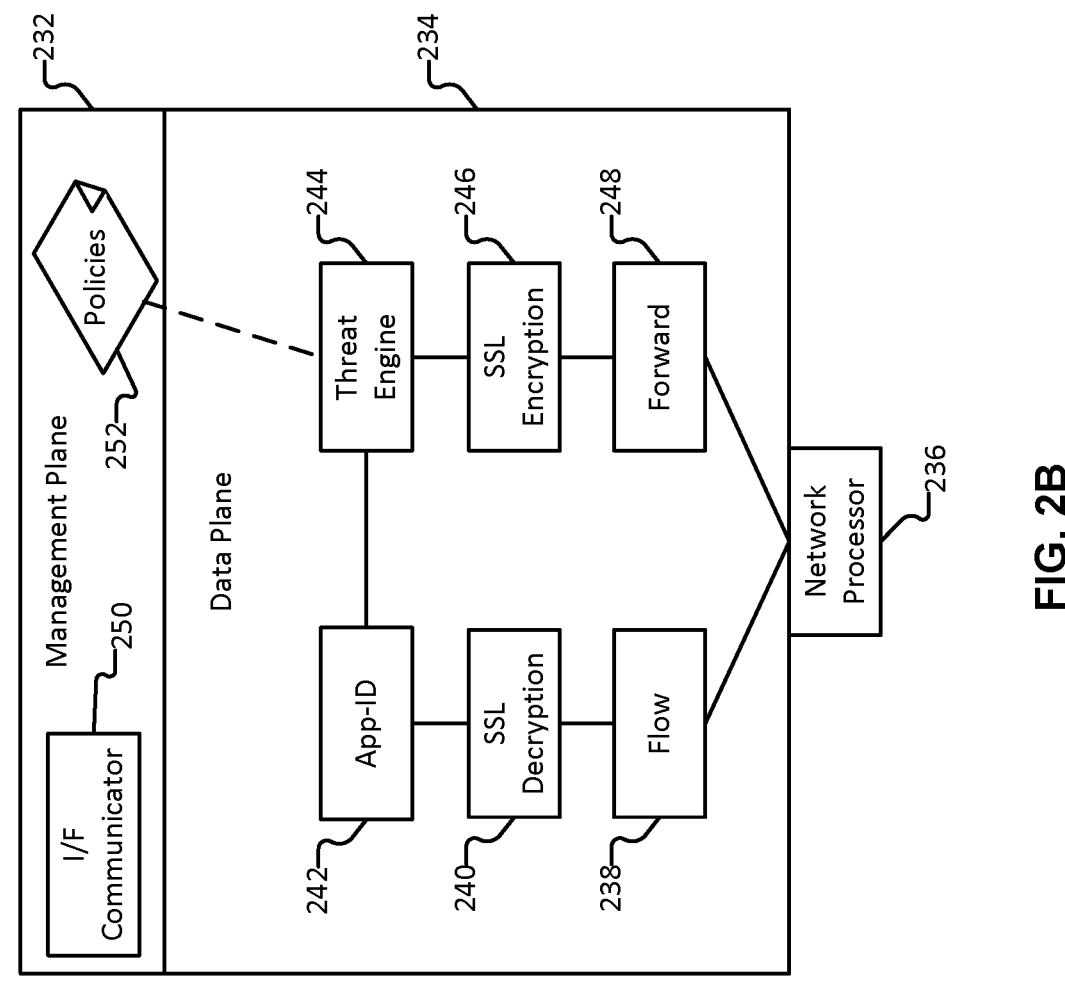
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system, such as by communicating a request message to the cloud system without mediation or forwarding the message through the management plane.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIS, messages, or network protocol communications or other communication mechanisms).

Various other services may be implemented on data plane 234. The plurality of services/processes running on the data plane(s) of the inline security entity are configured to store request messages in a shared memory, and another process on the data plane (e.g., on a message reader side of the data plane), such as a daemon, reads the message and facilitates communication of the request message to the cloud security entity (e.g., security platform 140 of system 100). As described above, various embodiments enforce quotas with respect to a number of request messages that may be buffered/queued in the shared memory by a service/process running on the data plane of the inline security entity. Enforcing quotas prevents the message-reader side of the data plane(s) of inline security entity to be overwhelmed by request messages written by the plurality of processes to the same shared memory.

The data plane(s) of the inline security entity may connect to the cloud system. For example, the daemon running on the message-reader side of the shared memory (e.g., the WIFClient) connects to a process running on cloud system (e.g., a file manager service) that receives the request message and determines the service to which the corresponding data is to be provided for cloud processing. For example, the file manager service running on the cloud system directs the data/request message to the corresponding service based on a determination of a connector via which the data plane connected to the cloud system to communicate the request message to the cloud system.

Figure 3:
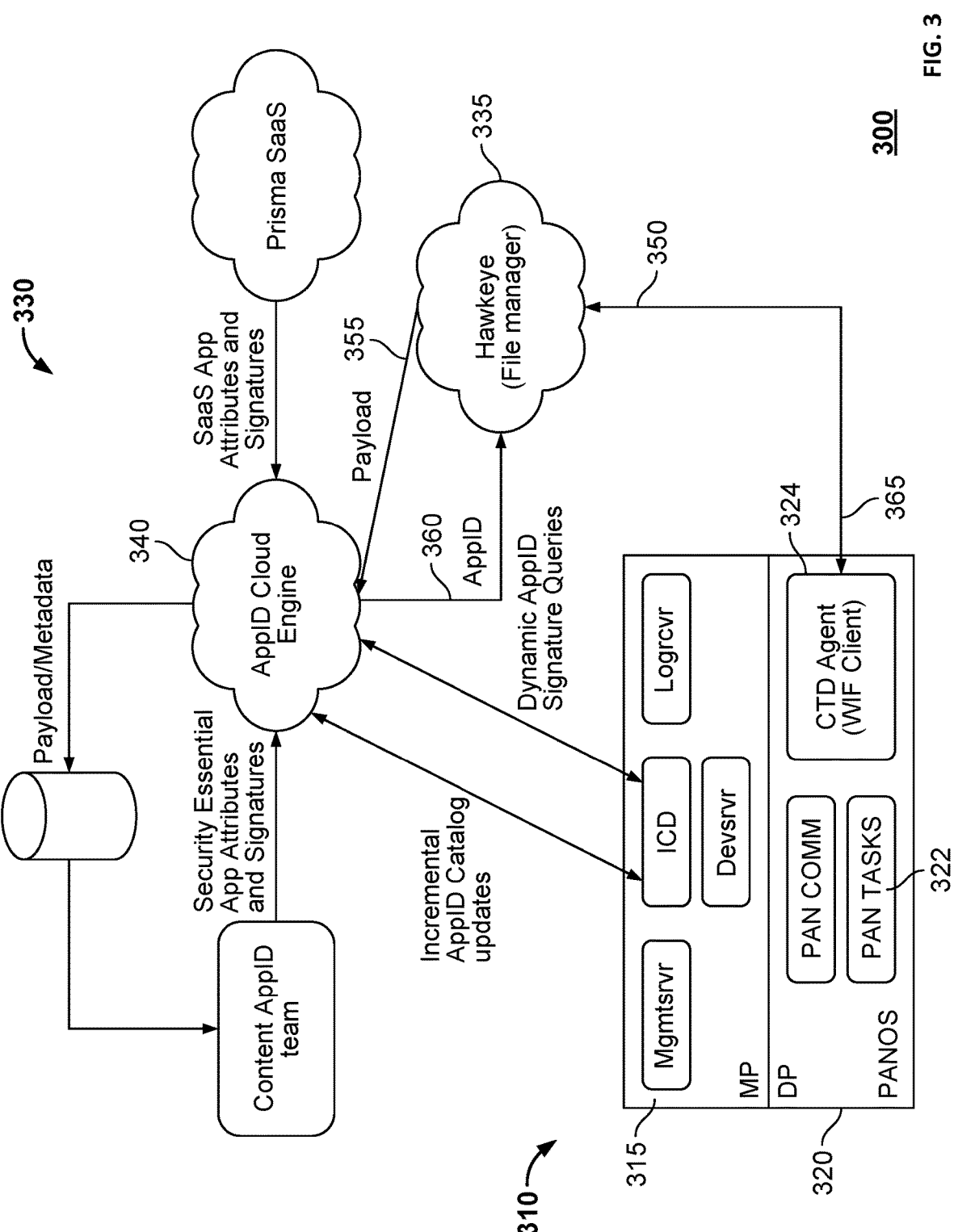
FIG. 3 is a bock diagram of an environment in which an inline security entity offloads services to a cloud system.

FIG. 3 is a bock diagram of an environment in which an inline security entity offloads services to a cloud system. In the example shown, inline security entity 310 communicates with cloud system 330. Inline security entity 310 may receive traffic data, such as across a network being monitored/protected, and inline security entity 310 selectively locally processes (e.g., analyzes) the traffic data or offloads processing of the traffic data to cloud system 330.

In some embodiments, inline security entity 310 comprises management plane 315 and data plane 320. Inline security entity 310 may provide a plurality of services, which are shown as PAN tasks 322. The plurality services may correspond to a plurality of processes or applications running on data plane 320. In response to inline security entity 310 (e.g., the corresponding service) determining to offload processing to cloud system 330 (e.g., the cloud security entity), the corresponding process (e.g., a task of PAN tasks 322) writes a request message to a shared memory (e.g., a local memory to inline security entity 310) that is shared among the plurality of services. In response to the request message being written to the shared memory, a process (e.g., shown as the CTD agent 324 or WIFClient) running on a message-reader side of data plane 320 reads the message and communicates the message to cloud system 330.

In response to reading the request message from the shared memory, the WIFClient (e.g., the daemon process running on data plane 320) connects to cloud system 330. In the example shown, the WIFClient connects to file manager service 335 of cloud system 330. For example, at step 350, the WIFClient communicates the request message to file manager service 335.

In response to receiving the request message from the WIFClient, file manager service 335 determines the particular service provided by cloud system 330 to which file manager service 335 is to forward the request message for cloud processing. In the example shown, file manager service 335 determines that the data for the request message is to be processed by the AppID Cloud Engine (ACE) service 340. The ACE service 340 may identify a particular application to which traffic data corresponds, such as based on a fingerprint of the traffic, etc. In response to determining that the data is to be processed by ACE service 340, at 335, file manager service 335 sends the request message/data to ACE service 340.

In response to receiving the request message from file manager service 335, ACE service 340 processes the data for the request message. For example, ACE service 340 classifies the data to determine an application to which the data corresponds. ACE service 340 may classify the data using a model (e.g., a model trained using machine learning processes) to predict the application. In response to determining the application to which the data corresponds, at 360, ACE service 340 provides file manager service 335 with an indication of the application to which the data corresponds (e.g., an application identifier, or AppID).

In response to receiving the result (e.g., the verdict) from the processing of the data using ACE service 340, at 365, file manager service 335 provides the result (e.g., a result message) to the inline security entity. For example, file manager service 335 communicates the result to the WIFClient running on 320. In response to receiving the result from file manager service 335, the WIFClient stores information pertaining to the result to a shared memory (e.g., a reverse-direction shared memory), which is shared by the plurality of services (e.g., PAN tasks 322) running on data plane 320. For example, in the case of the reverse-direction shared memory, the WIFClient is the only message writer to the reverse-direction shared memory and the PAN tasks 322 correspond to a plurality of message readers from the reverse-direction shared memory. Because the reverse-shared memory only has one corresponding message writer (e.g., the WIFClient), the plurality of message readers (e.g., PAN tasks 322) are not overwhelmed by the volume of messages. Accordingly, in various embodiments, the reverse-direction communication does not implement quotas or indexing of a number of messages written (e.g., by the WIFClient) to the shared memory or a number of messages read from the shared memory (e.g., by PAN tasks 322).

Figure 4:
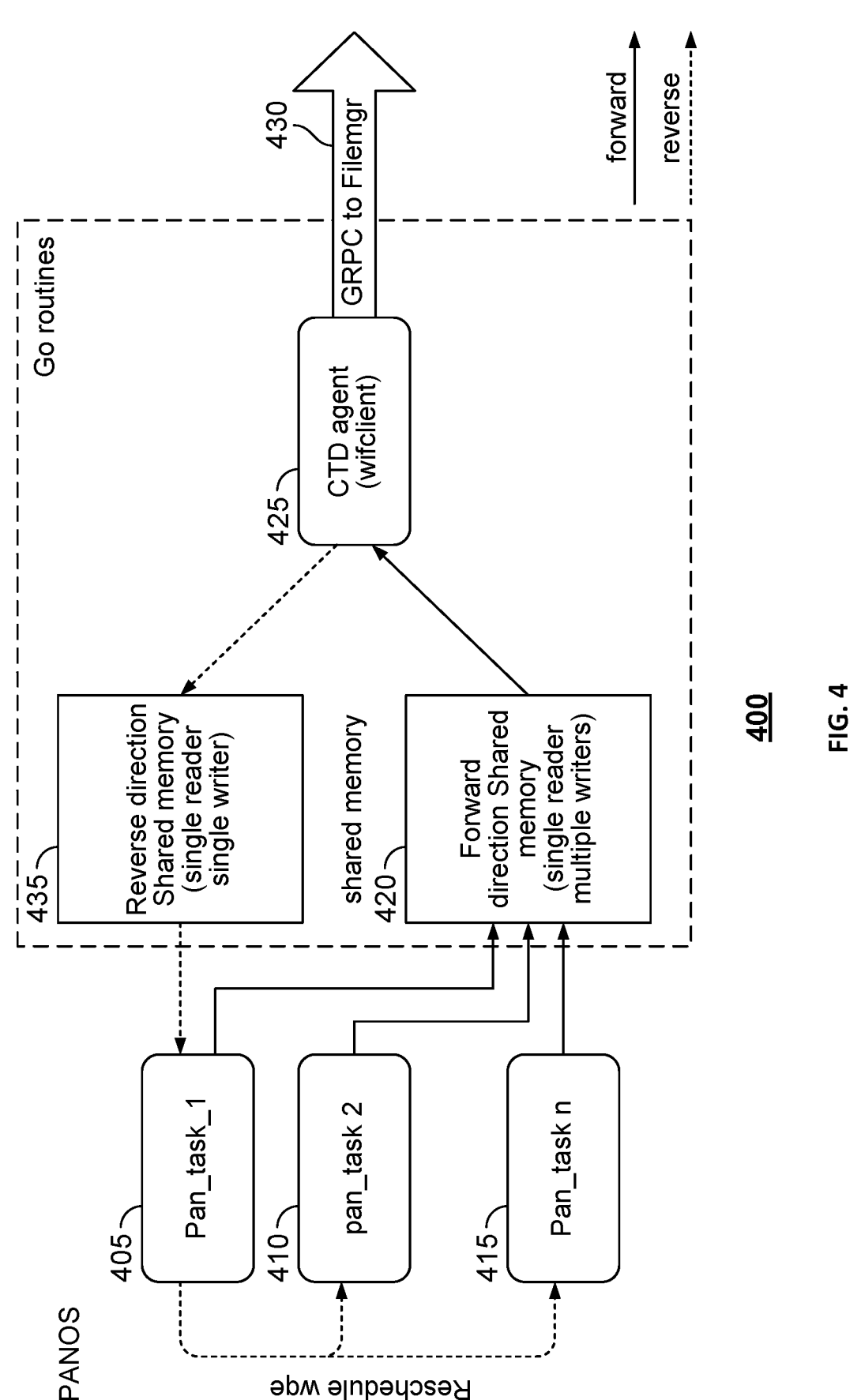
FIG. 4 illustrates a processing of data on a data plane of an inline security entity according to various embodiments.

FIG. 4 illustrates a processing of data on a data plane of an inline security entity according to various embodiments. In the example shown, data plane 400 has a plurality of services (e.g., applications) running, including service 405 (e.g., Pan_task_1), service 410 (pan_task_2), and up to service 415 (e.g., Pan_task n). Services 405, 410, and 415 share a shared memory 420 to communicate requests to a cloud system, such as in connection with offloading processing to the cloud system. In some embodiments, data plane 400 has N services that run on data plane 400 and share shared memory 420. N is a positive integer.

As illustrated in FIG. 4, service 405, 410, and 415 write request messages to shared memory 420. Shared memory 420 may also be referred to as the forward-direction shared memory. The system uses shared memory 420 to queue messages for offloading data from a plurality of local services (e.g., service 405, 410, and 415) to a cloud system. As an example, shared memory has a single reader (e.g., WIFClient 425) and multiple writers (e.g., the multiple writers are service 405, 410, and 415).

Data plane 400 further comprises a process (e.g., WIFClient 425) that reads request messages from shared memory 420 and facilitates communication with the cloud system for offloading the processing of the data to the cloud system.

WIFClient 425 reads a request message from the queue in shared memory 420 and connects to the cloud system. WIFClient 430 may communicate the request message to the cloud system (e.g., a file manager service running on the cloud system) via a gRPC Remote Procedure Calls (GRPC).

The cloud system processes the data for the request message and communicates a result message (e.g., a verdict) to the inline security entity. In some embodiments, the cloud system provides the result message to WIFClient 425. In response to receiving the result message, WIFClient 425 writes the result message, or information pertaining to the result message, to shared memory 435. Shared memory 435 may also be referred to as the reverse-direction shared memory. In the example shown, shared memory 435 has one message writer (e.g., WIFClient 425) and one message reader (e.g., service 405). In response to WIFClient 425 writing the result message to shared memory 435, service 405 retrieves the result message and forwards the result to the corresponding service. As an example, the result may have associated metadata that indicates the service that requested the processing corresponding to the result, or an identifier associated with the request message from which the system can determine the service from which the request message originated). In some embodiments, services 405, 410, and/or 415 are configured to read the result directly from shared memory 435 (e.g., in which case shared memory 435 has a plurality of message readers).

Figure 5A:
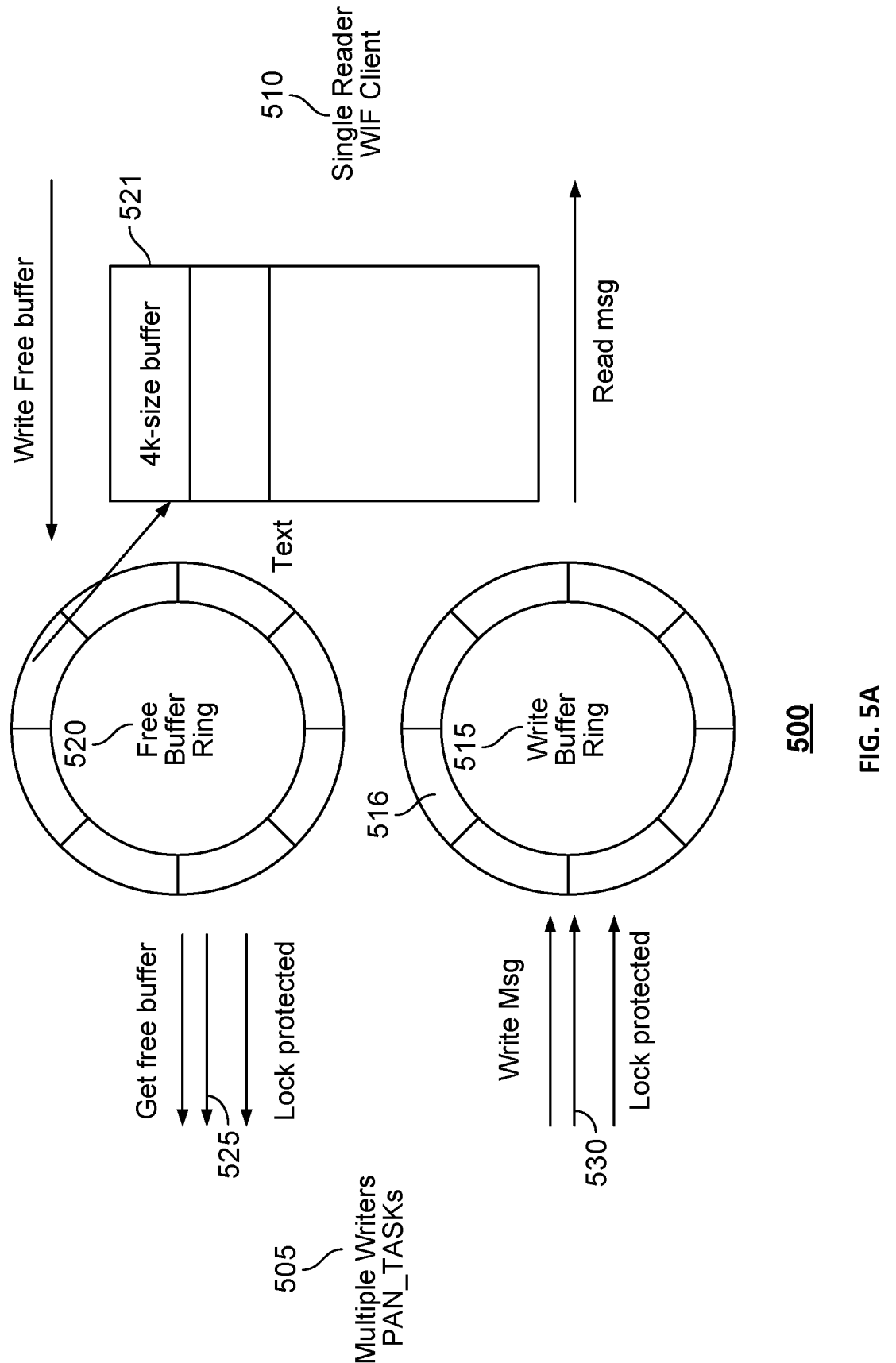
FIG. 5A illustrates a forward direction shared memory system implemented by a data plane of an inline security entity according to various embodiments.

FIG. 5A illustrates a forward direction shared memory system implemented by a data plane of an inline security entity according to various embodiments. In the example shown, forward direction shared memory system 500, which is implemented at the data plane of an inline security entity, comprises a plurality of services 505 that write messages (e.g., request messages) to the shared memory, and a single process 510 (e.g., the WIFClient) that reads messages from the shared memory.

In some embodiments, the forward direction shared memory system comprises two buffers (e.g., buffer rings)—write buffer ring 515 and free buffer ring 520. When one of the plurality of service 505 is to write a message to the shared memory (e.g., for offloading of processing of data to the cloud security entity), the system allocates a shared buffer from the free message queue (e.g., free buffer ring 520). For example, in the example shown, at 525, shared buffer 521 is allocated for the writing to write buffer ring 515 at 530. The system may allocate the shared buffer from the free message queue in response to receiving a request for an allocation (e.g., an indication that a message is to be written to the shared memory for offloading of data processing). In response to receiving the allocation from the free message queue, the service (e.g., the service of the plurality of services 505 which requested allocation) writes the data into the shared buffer. After writing the data into the shared buffer data, the service of the plurality of services 505 can write the shared buffer index to the write buffer queue (e.g., write buffer ring 515). Process 510 reads the data/message from the shared memory, and in response to reading the data/message from the shared memory (e.g., after it copied out the data), the system frees the corresponding allocated shared buffer in the free-message queue (e.g., the free buffer ring).

Figure 5B:
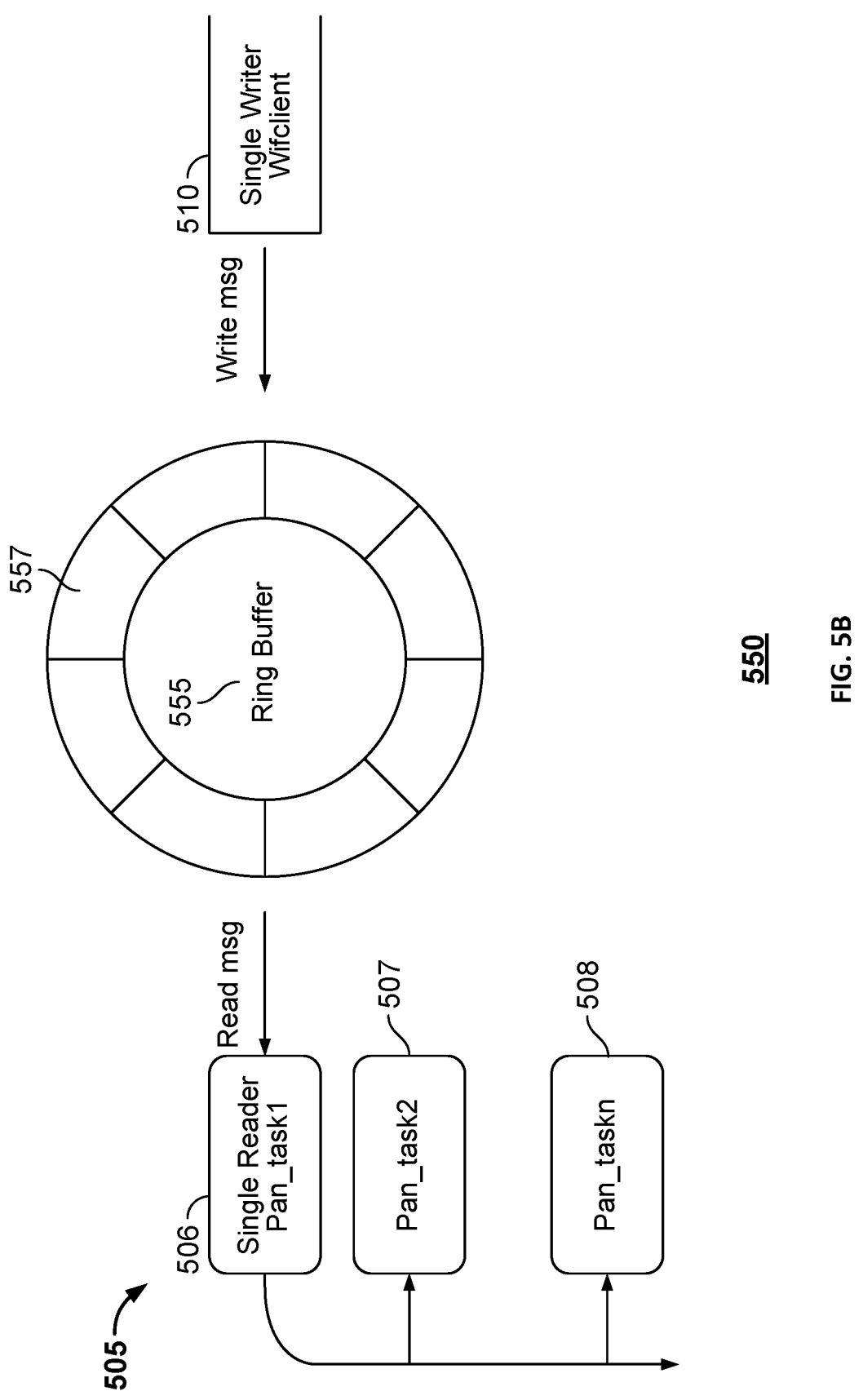
FIG. 5B illustrates a reverse direction shared memory system implemented by a data plane of an inline security entity according to various embodiments.

FIG. 5B illustrates a reverse direction shared memory system implemented by a data plane of an inline security entity according to various embodiments. In the example shown, reverse direction shared memory system 550, which is implemented at the data plane of an inline security entity, comprises a plurality of services 505 that write messages (e.g., request messages) to the forward direction shared memory, and a single process 510 (e.g., the WIFClient) that reads messages from the forward direction shared memory. In the reverse direction shared memory system, process 510 writes messages to the reverse direction shared memory (e.g., buffer ring 555). The reversed shared memory may be a lockless reader-writer system.

In some embodiments, process 510 writes a message to the reverse direction shared memory in response to receiving a verdict from the cloud security entity to which processing of corresponding data was offloaded. For example, process 510 running in the data plane receives the verdict from the cloud security entity and provides the verdict to the corresponding service, running on the data plane, that had requested offloading processing.

As illustrated in FIG. 5B, reverse direction shared memory system 550 is configured to comprise a single service that reads messages from the reverse direction shared memory (e.g., buffer ring 555). For example, service 506 of the plurality of service 505 running on the data plane (e.g., the plurality of services provided by the inline security entity) is configured to read result message from the reverse direction shared memory. In response to reading the result message, service 506 provides (e.g., distributes) the result message to the service from which the corresponding request message originated (e.g., service 507 or 508).

Figure 6A:
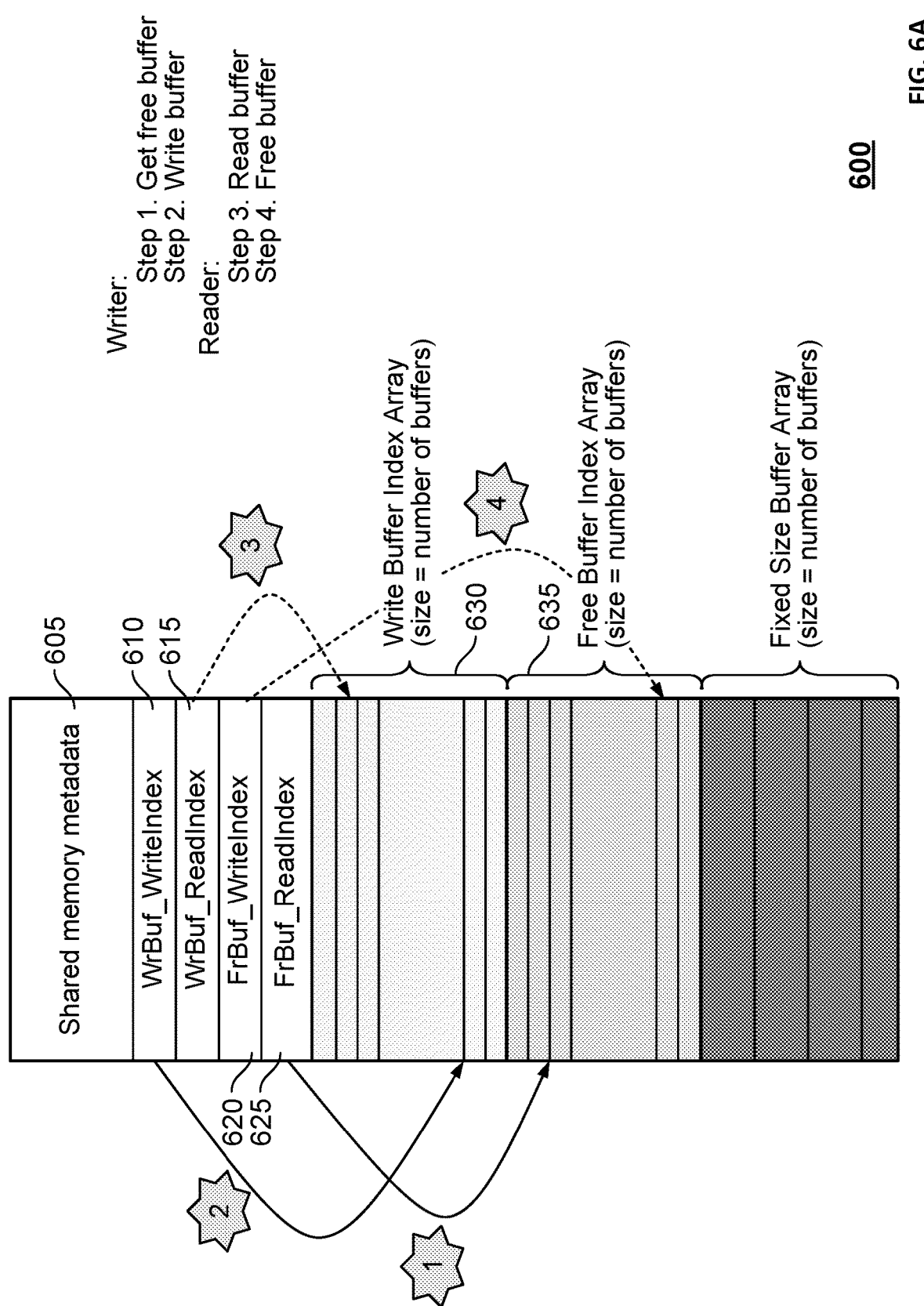
FIG. 6A illustrates a forward direction shared memory system implemented by a data plane of an inline security entity according to various embodiments.

FIG. 6A illustrates a forward direction shared memory system implemented by a data plane of an inline security entity according to various embodiments. Shared memory system 600 comprises shared memory metadata 605, a write buffer queue wire index 610, a write buffer read index 615, a free buffer write index 620, and a free buffer read index 625. In connection with offloading data processing to cloud security entities, services running on the data plane of the inline security entity write request messages (e.g., corresponding to requests for offloaded data processing) and another process (e.g., the WIFClient) running on the data plane connects to the cloud security entity and communicates the request message.

In response to determining to offload data processing to a cloud security entity, shared memory system 600 obtains a free buffer. For example, shared memory system 600 obtains an allocation in free buffer index array 635. In response to receiving an allocation in the free buffer index array, the service writes a message to corresponding allocation in the write buffer index array 630. The reader-side process (e.g., the WIFClient) running on the data plane then reads the message from write buffer index array 630 and uses the free buffer index array 635 to free the corresponding allocation in the buffer from which the reader-side process retrieved the message.

Figure 6B:
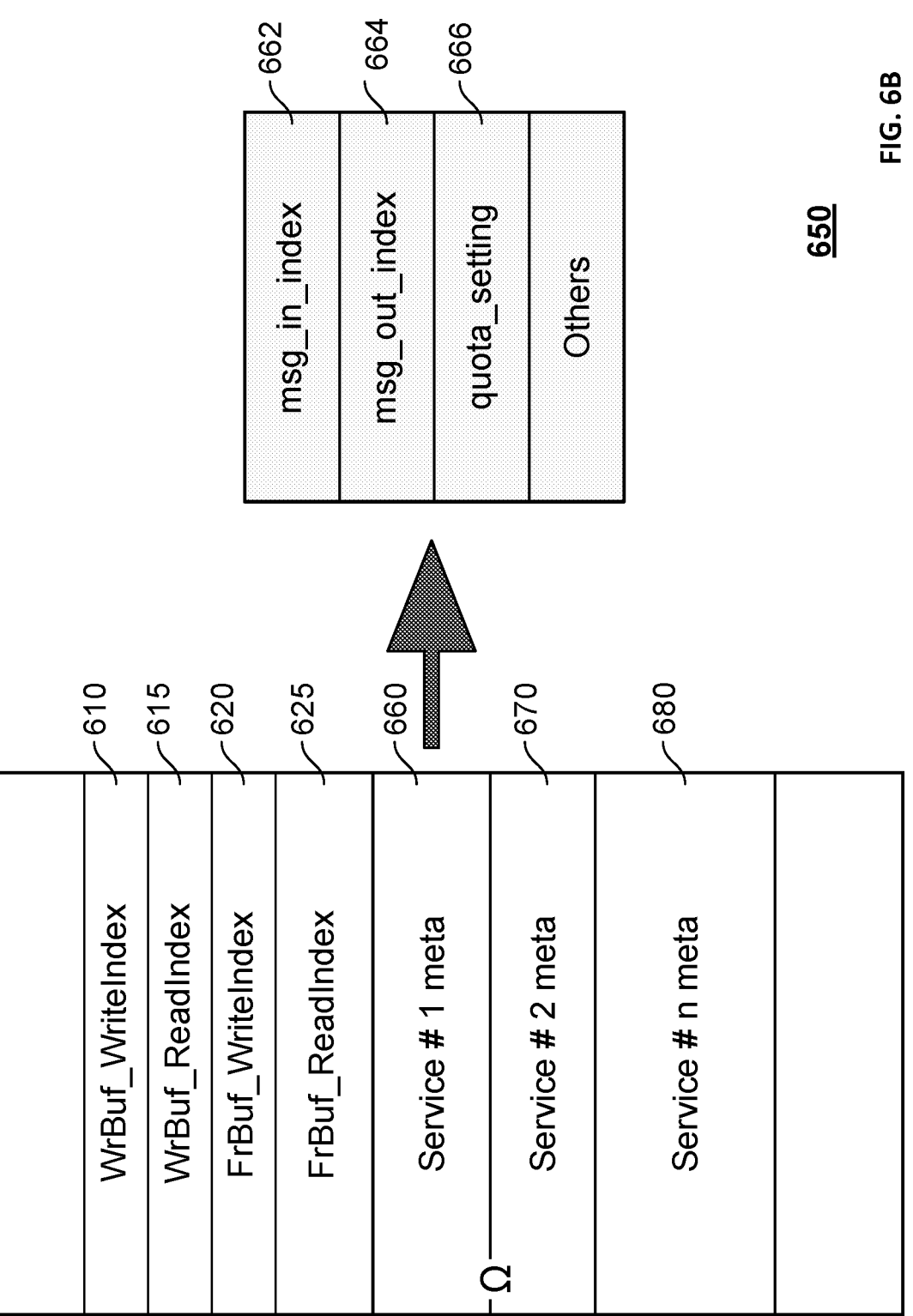
FIG. 6B illustrates a forward direction shared memory system implemented by a data plane of an inline security entity according to various embodiments.

FIG. 6B illustrates a forward direction shared memory system implemented by a data plane of an inline security entity according to various embodiments. In the example shown, shared memory system 650 comprises metadata associated with the respective services running on the data plane (e.g., the services that write request messages to the forward direction shared memory). For example, shared memory system 650 comprises metadata 660 for a first service, metadata 670 for a second service, and metadata 680 for the Nth service, where N is a positive integer corresponding to a number of services running on the inline security entity (e.g., that share the shared memory). In some embodiments, shared memory system 650 uses metadata 660, 670, and/or 680 in connection with enforcing flow control of request messages/offloading of data processing to be read by the reader-side process (e.g., the WIFClient) and sent to the cloud security entity.

Each of the service metadata comprises one or more of indexes/counters and quota. For example, metadata 660 comprises a message-in index 662 and a message-out index 664. When the first service writes a request message to the forward direction shared memory, an indication of the written request message is written to the message-in index (e.g., shared memory system 650 increases a message-in index counter). Conversely, when the reader-side process reads a request message from the forward-direction memory, an indication of the reading of the request message is written to the message-out index (e.g., shared memory system 650 increases a message-out index counter).

Shared memory system 650 uses the message-in index counter in connection with determining whether a request message is to be written into the shared memory or whether the message-reader side is overwhelmed with volume of requests from the processes/tasks (e.g., applications) that share the shared memory. For example, if the message-reader side process (e.g., the WIFClient) is too slow in processing the request messages, the buffer of requests messages in the queue may become full/used up. The message-in index (e.g., the message-in index counter) indicates the total number of messages in the buffer.

In connection with processing the request messages written to the shared memory, shared memory system 650 increases a message-out index (e.g., the read index) counter in response to the process on the reader-side of the shared memory (e.g., the daemon, such as the WIFClient) reading the request message. For example, the reading of the request message by the process on the message-reader side is deemed to be indicative of the system having processed the request message and offloaded the processing to the cloud system. Shared memory system 650 uses the message-out index counter in connection with determining whether a request message is to be written into the shared memory or whether the message-reader side is overwhelmed with volume of requests from the processes/tasks (e.g., applications) that share the shared memory.

In some embodiments, shared memory system 650 uses the message-out index counter and the message-in index counter to determine whether to process a particular request message (e.g., whether to permit the service to write the request message to the shared memory). For example, shared memory system 650 uses the message-out index counter and the message-in index counter to determine whether to write the particular request message to the buffer (e.g., the shared memory). Shared memory system 650 may compare the message-out index counter and the message-in index counter to determine whether the buffer has sufficient capacity for new request messages. For example, if the difference between the message-in index counter and the message-out index counter is greater than the allocated shared memory (or greater than the number of messages that can be written to the allocated shared memory), then the system (e.g., the message writer task/process) does not write the new request message to the shared memory or the system does not provide or otherwise blocks the corresponding service.

In some embodiments, the various processes (e.g., applications, services, etc.) running on the system that share the shared memory have quotas indicating an amount/number of request messages that the various processes are permitted to have pending in the shared buffer. The metadata associated with a service may store information pertaining to the quota for that service. For example, metadata 660 comprises quota setting 666 in which shared memory system 650 stores information/configurations for the quota (e.g., such as an amount of space in the shared memory or a number of request messages that may be written in the shared memory).

In some embodiments, each of the plurality of processes have corresponding quota. In some embodiments, a subset of the plurality of processes are grouped, and each group has a corresponding quota shared among the processes in the particular group. Shared memory system 650 stores a message-in index and a message out index for each process (or group of processes, as applicable). In connection with writing a new request message to the shared memory, shared memory system 650 obtains the message-in index counter and the message-out index counter for the particular process (or group of processes, as applicable) requesting the service (e.g., requesting to offload the processing to the cloud service) and determines whether the allocated space in the shared memory for the process (e.g., the number of messages that may be written to the shared memory based on the corresponding quota) has sufficient space for the new request message. For example, shared memory system 650 determines the allocated space in the shared memory for a particular process based at least in part on multiplying a predefined number of available spaces for request messages by the quota corresponding to the particular process (or group of processes, as applicable). If the difference between the message-in index counter and the message-out index counter for that service is greater than the product of the available spaces for request messages and the corresponding quota for the particular process, then the allocated space in the shared memory does not have sufficient capacity for new request messages until the message-reader side processes (e.g., reads out) the request messages (e.g., sends the requests to the cloud system for processing). In some implementations, in response to determining that the allocated space in the shared memory does not have sufficient capacity for new request messages, the system restricts writing of new request messages (e.g., the process is controlled to not write a new request message to the shared memory, or a corresponding service is blocked).

Figure 7:
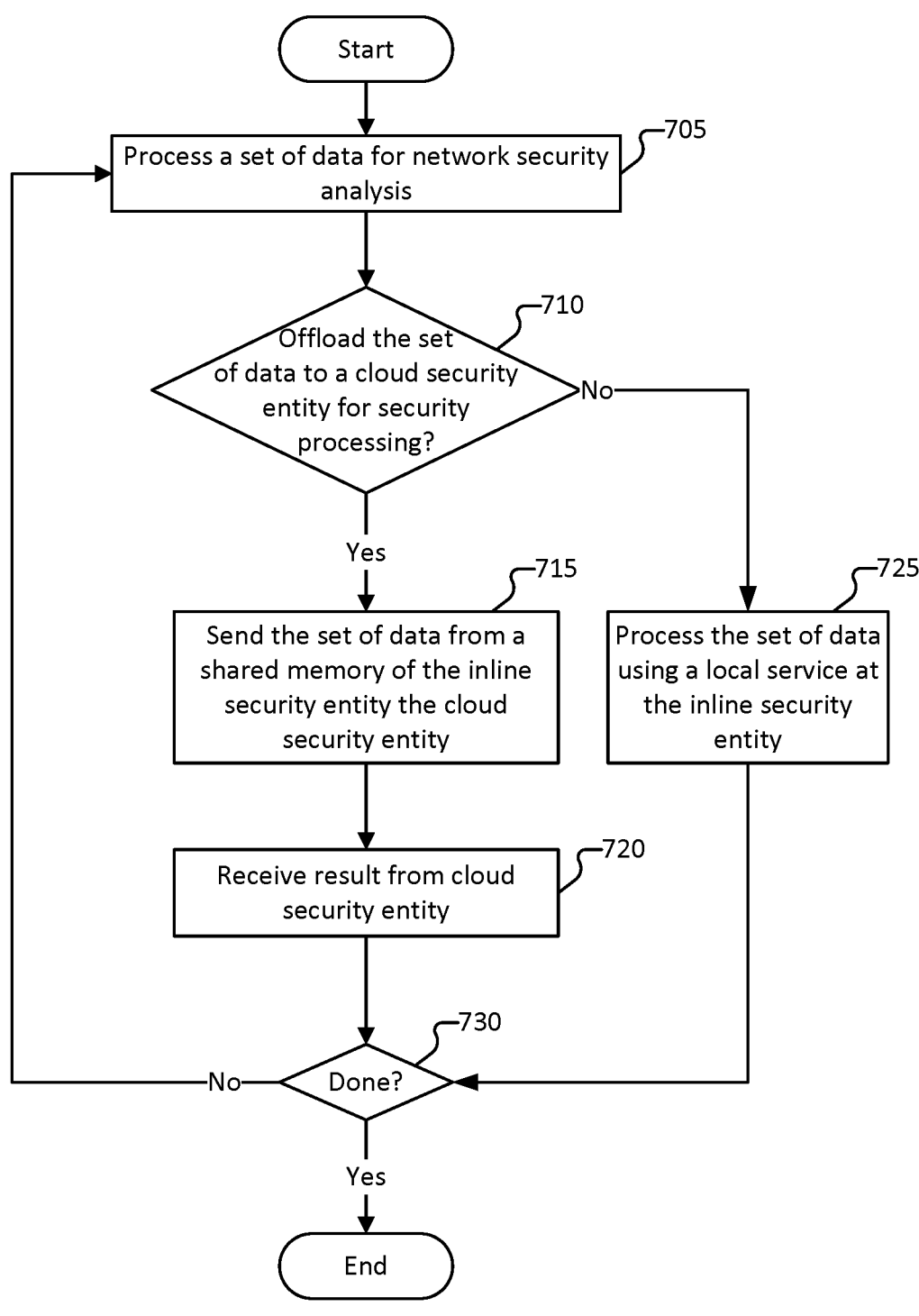
FIG. 7 is a flow diagram of a method for offloading data processing from an inline security entity to a cloud security entity according to various embodiments.

FIG. 7 is a flow diagram of a method for offloading data processing from an inline security entity to a cloud security entity according to various embodiments. In some embodiments, process 700 is implemented at least in part by system 100 of FIG. 1 and/or data appliance 102 of FIGS. 2A and 2B. Process 700 may be implemented by an inline security entity, such as in connection with offloading processing data to a cloud security entity.

At 705, a set of data is processed for security analysis. The system (e.g., an inline security entity) obtains data that is to be processed. The set of data may correspond to traffic data (e.g., traffic across a network), application data (e.g., information processed or generated by an application), input strings, files, etc.

At 710, the system determines whether to offload the set of data to a cloud security entity for security processing. In some embodiments, the inline security entity is configured to perform low-latency processing locally and to offload heavy compute processing to the cloud security entity. In response to receiving data, the inline security analysis determines whether to process the set of data locally, such as by using information stored in a cache of the inline security entity. As an example, the system determines whether to locally process the set of data using a local classifier, a policy, a mapping (e.g., a mapping of signatures to indications of whether the data is malicious), etc. As another example, in response to determining that a mapping of signatures to indications of whether data is malicious does not include a signature matching the set of data, the inline security entity determines to offload the security processing (e.g., analysis of whether the data is malicious, etc.) to the cloud security entity.

In response to determining to offload the set of data to the cloud security entity at 710, process 700 proceeds to 715 at which the set of data is sent from a shared memory of the inline security entity to the cloud security entity. In response to determining to offload the set of data to the cloud security entity, the set of data is stored in a shared memory and the set of data is obtained from the shared memory and communicated to the cloud security entity. In some embodiments, processes running on a data plane of the inline security entity store the set of data (e.g., messages for the set of data) to a shared memory in connection with providing the set of data, or a request for the cloud security entity to process the set of data, to another process (e.g., the WIFClient) running on the data plane of the inline security entity. The shared memory may be used as a mechanism of inter-process communication between (i) processes (e.g., tasks, services, etc.) running on the data plane (e.g., running on the writer-side of the shared memory) and (ii) another process (e.g., a daemon, such as the WIFClient) that connects to the cloud service to send request messages or receive verdicts (e.g., result messages). In some embodiments, the other process (e.g., the WIFClient) retrieves the set of data from the shared memory, connects to the cloud security entity, and sends the set of data, or corresponding request message, to the cloud security entity (e.g., a file manager service running on the cloud security entity, which is configured to route the request messages to the corresponding cloud service).

In some embodiments, the storing the set of data to the shared memory is performed in a separate step from the sending the set of data from the shared memory to the cloud entity, or the sending the set of data may comprise the step of storing the set of data.

At 720, a result is received from the cloud security entity. In response to determining a result corresponding to the processing of the set of data (e.g., a result message), the cloud security entity sends the result to the inline security entity. In some embodiments, the cloud security entity provides the result to the process running on the reader-side of the shared memory (e.g., the WIFClient). In response to obtaining the result from the cloud security entity, the process running on the reader-side of the shared memory (e.g., the forward direction shared memory) writes the result to the shared memory system (e.g., the WIFClient writes the result message to the reverse direction shared memory).

In response to determining that the set of data is not to be offloaded to the cloud security entity at 710, process 700 proceeds to 725 at which the set of data is processed using local service at the inline security entity. In some embodiments, the inline security entity processes the set of data if the inline processing is not computationally intensive (e.g., the computation required is less than a computation threshold) or if the inline security entity stores information in a local cache that can be used to process the set of data (e.g., to determine whether the set of data is malicious, such as based on a previously analyzed sample).

At 730, a determination is made as to whether process 700 is complete. In some embodiments, process 700 is determined to be complete in response to a determination that no further data is to be processed (e.g., no traffic data is to be assessed with respect to a security analysis), an administrator indicates that process 700 is to be paused or stopped, etc. In response to a determination that process 700 is complete, process 700 ends. In response to a determination that process 700 is not complete, process 700 returns to 705.

Figure 8:
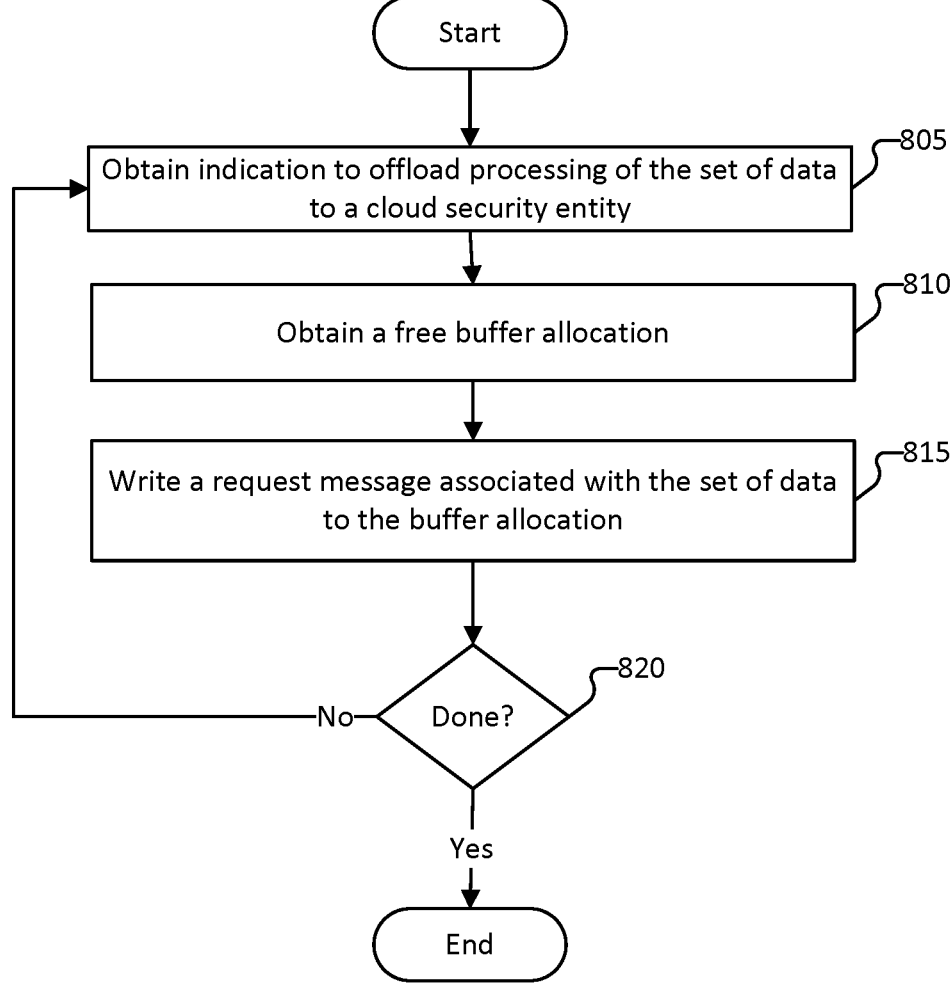
FIG. 8 is a flow diagram of a method for offloading data processing from an inline security entity to a cloud security entity according to various embodiments.

FIG. 8 is a flow diagram of a method for offloading data processing from an inline security entity to a cloud security entity according to various embodiments. In some embodiments, process 800 is implemented at least in part by system 100 of FIG. 1 and/or data appliance 102 of FIGS. 2A and 2B. Process 800 may be implemented by an inline security entity, such as in connection with offloading processing data to a cloud security entity. In some embodiments, process 800 is implemented by a first process of a plurality of processes that share the shared memory. The first process may be implemented on a message writer side of the shared memory (e.g., the forward direction shared memory).

In some embodiments, process 800 is implemented in connection with 715 of process 700 of FIG. 7. For example, process 800 may be invoked by 715, or may be invoked by process 700 before performing 715.

At 805, an indication to offload processing of the set of data to the cloud security entity is obtained. The indication may be generated by the local service (e.g., an application, process, etc.) running on the data plane of the inline security entity.

At 810, a free buffer allocation is obtained. In response to determining to offload data processing to a cloud security entity, the shared memory system obtains a free buffer. In some embodiments, a process running on the message writer side of the shared memory (e.g., the forward direction shared memory) determines to offload the processing of the set of data and/or queries the shared memory system for the free buffer. The free buffer may be an allocation in the shared memory for writing the request message to offload the processing of the set of data to the cloud security entity. As an example, the shared memory system obtains an allocation in a free buffer index array.

At 815, a request message associated with the set of data is written to the buffer allocation. The request message may correspond to a message for requesting a cloud security entity to use a cloud service to process the set of data. In response to receiving an allocation of the free buffer, the process (e.g., a local service) running on the data plane on the message reader side of the shared memory writes the request message to the shared memory (e.g., the allocated free buffer).

In some embodiments, in response to storing to the shared memory the request message and/or associated data to be offloaded to the cloud security entity, the shared memory system (e.g., the process running on the message writer side of the shared memory or another process managing the shared memory system) provides an indication to the other process (e.g., the WIFClient) running on the message reader side of the shared memory (e.g., the forward direction shared memory).

At 820, a determination is made as to whether process 800 is complete. In some embodiments, process 800 is determined to be complete in response to a determination that no further data is to be offloaded to the cloud security entity (e.g., no traffic data is to be assessed with respect to a security analysis), an administrator indicates that process 800 is to be paused or stopped, etc. In response to a determination that process 800 is complete, process 800 ends. In response to a determination that process 800 is not complete, process 800 returns to 805.

Figure 9:
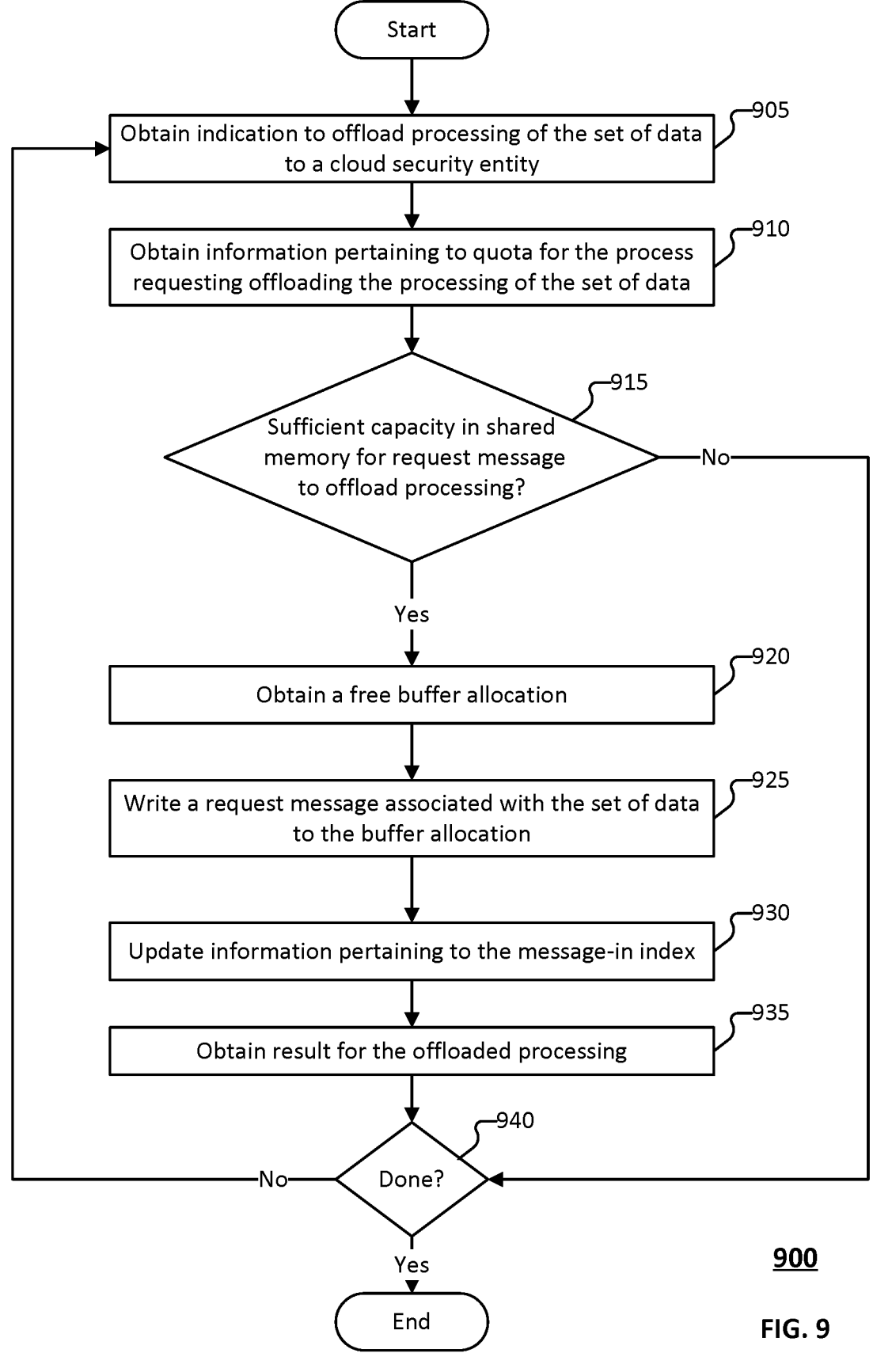
FIG. 9 is a flow diagram of a method for using a multi-application shared memory for offloading processing of data from an inline security entity to a cloud security entity according to various embodiments.

FIG. 9 is a flow diagram of a method for using a multi-application shared memory for offloading processing of data from an inline security entity to a cloud security entity according to various embodiments. In some embodiments, process 900 is implemented at least in part by system 100 of FIG. 1 and/or data appliance 102 of FIGS. 2A and 2B. Process 900 may be implemented by an inline security entity, such as in connection with offloading processing data to a cloud security entity. In some embodiments, process 900 is implemented by a first process of a plurality of processes that share the shared memory. The first process may be implemented on a message writer side of the shared memory (e.g., the forward direction shared memory).

In some embodiments, process 900 is implemented in connection with 715 of process 700 of FIG. 7. For example, process 900 may be invoked by 715, or may be invoked by process 700 before performing 715.

At 905, an indication to offload processing of the set of data to the cloud security entity is obtained. The indication may be generated by the local service (e.g., an application, process, etc.) running on the data plane of the inline security entity.

At 910, information pertaining to the quota for the process requesting the offloading the processing of the set of data to the security entity is obtained. In some embodiments, the quota is associated with the process requesting the offloading. In some embodiments, the quota is associated with a group of processes including the process requesting the offloading. The information pertaining to quota may include the shared memory quota for the process and a current usage of the shared memory by the process.

At 915, the system determines whether the shared memory has sufficient capacity for the request message to offload processing. In some embodiments, the system determines whether the quota in the shared memory for the process has sufficient capacity for the request message. For example, the system (e.g., the shared memory system, the process requesting the offloading, etc.) determines whether the current usage of the shared memory by the process is equal to or greater than the quota for the process. In response to determining that the current usage of the shared memory (e.g., the number of request messages stored by the process) by the process exceeds the quota for the process, the system deems the shared memory to not have sufficient capacity to store a request message for the offloading of the process. In response to determining that the current usage of the shared memory does not exceed the quota for the process, the system deems the shared memory to have sufficient capacity for the request message.

In response to determining that the shared memory does not have sufficient capacity to store the request message for offloading the processing of the set of data to the cloud security entity at 915, process 900 proceeds to 940. In some embodiments, the system restricts the writing of the request message to the shared memory until the available capacity in the quota for the process is sufficient to the request message. In some embodiments, the system does not provide the service or blocks the service in response to determining that the shared memory does not have sufficient capacity to store the request message.

In response to determining that the shared memory has sufficient capacity to store the request message for offloading the processing of the set of data to the cloud security entity at 915, process 900 proceeds to 920.

At 920, a free buffer allocation is obtained. In some embodiments, 920 is similar to, or corresponds to, 810 of process 800.

At 925, a request message associated with the set of data is written to the buffer allocation. In some embodiments, 920 is similar to, or corresponds to, 815 of process 800.

At 930, information pertaining to the message-in index is updated. In some embodiments, the system (e.g., the shared memory system, the process writing the request message, etc.) updates the message-in index to reflect the writing of the request message to the shared memory. As an example, the system updates (e.g., increments) a message-in index counter in connection with writing the request message to the shared memory.

At 935, a result for the offloaded processing is obtained. In some embodiments, process 935 is excluded from process 900. The result for the offloaded processing (e.g., the result message provided by the cloud security entity) may be obtained from the shared memory system, such as from a reverse direction shared memory. A process (e.g., the WIFClient) running on the message-reader side of the forward direction shared memory may store the result message to the reverse direction shared memory. In some embodiments, the process that requested the offloading of the processing (e.g., the process that stored the request message to the shared memory) obtains the result message from the reverse direction shared memory. In some embodiments, another process running on the message-writer side of the forward direction shared memory (e.g., running on the data plane of the inline security entity) obtains the result message and routes the result message to the associated process, such as the process that had stored the corresponding request message to the shared memory.

At 940, a determination is made as to whether process 900 is complete. In some embodiments, process 900 is determined to be complete in response to a determination that no further data is to be offloaded to the cloud security entity (e.g., no traffic data is to be assessed with respect to a security analysis), no further data is to be analyzed (e.g., processed with respect to a security analysis), an administrator indicates that process 900 is to be paused or stopped, etc. In response to a determination that process 900 is complete, process 900 ends. In response to a determination that process 900 is not complete, process 900 returns to 905.

Figure 10:
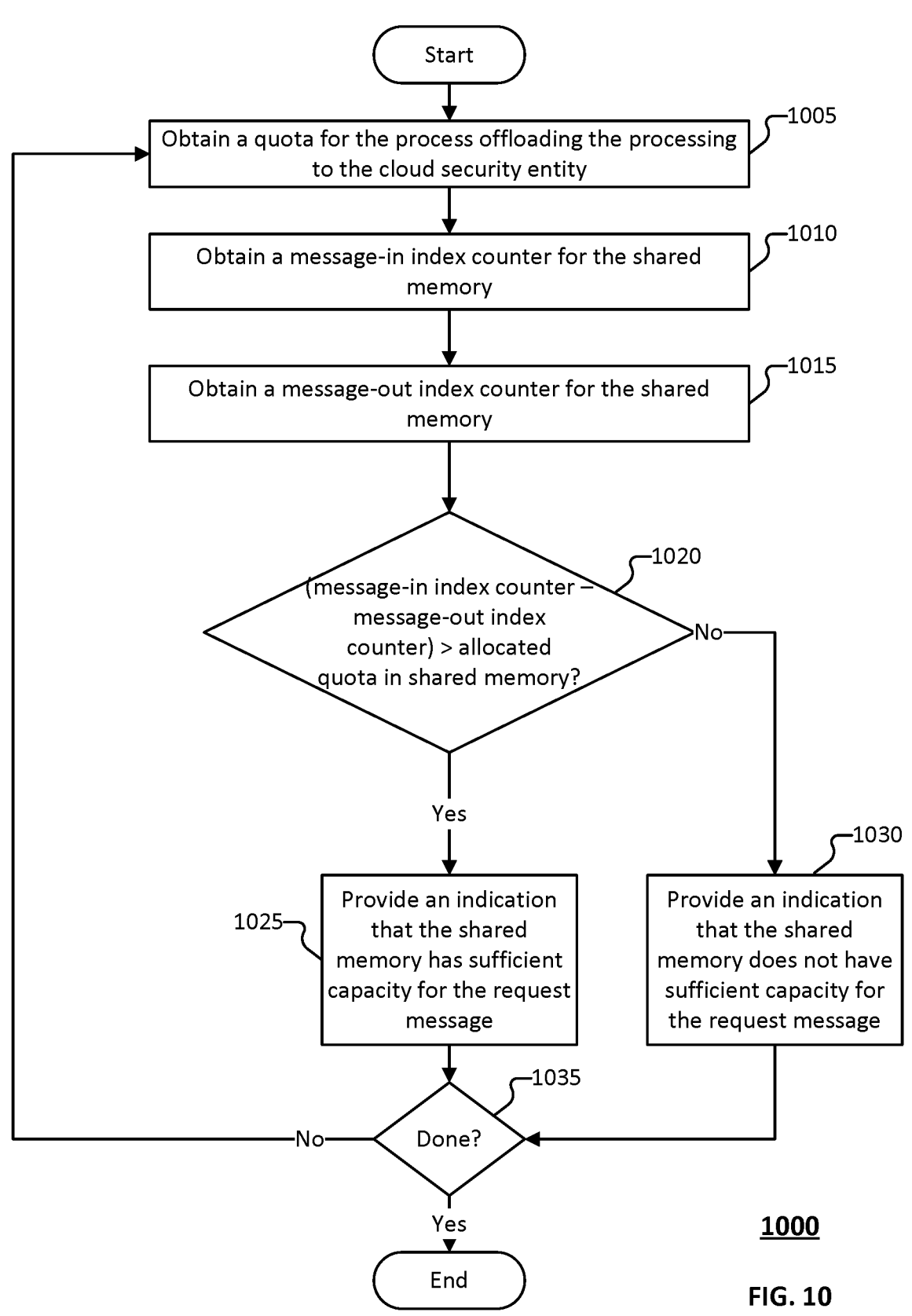
FIG. 10 is a flow diagram of a method for determining whether a shared memory has sufficient capacity for offloading processing of a set of data according to various embodiments.

FIG. 10 is a flow diagram of a method for determining whether a shared memory has sufficient capacity for offloading processing of a set of data according to various embodiments. In some embodiments, process 1000 is implemented at least in part by system 100 of FIG. 1 and/or data appliance 102 of FIGS. 2A and 2B. Process 1000 may be implemented by an inline security entity, such as in connection with offloading processing data to a cloud security entity. In some embodiments, process 1000 is implemented by a first process of a plurality of processes that share the shared memory. The first process may be implemented on a message writer side of the shared memory (e.g., the forward direction shared memory).

In some embodiments, process 1000 is implemented in connection with 915 of process 900 of FIG. 9. For example, process 1000 may be invoked by 915.

At 1005, a quota for the process that is seeking to offload processing of a set of data to the cloud security entity is obtained. In some embodiments, the system obtains quota information from metadata associated with the process (e.g., the service). For example, the system obtains the quota information from the shared memory system, such as the allocation at which metadata for the particular process is stored.

At 1010, a message-in index counter for the shared memory is obtained. In some embodiments, the message-in index counter corresponds to the particular process seeking to offload the processing (e.g., a number of messages in the message-in index 662 of FIG. 6B). The message-index counter may be obtained from metadata associated with the process (e.g., the service). For example, the system obtains information for the message-in index counter (e.g., a value of the counter) from the shared memory system, such as the allocation at which metadata for the particular process is stored. The message-in index counter may indicate the number of request messages that the particular process has written to the shared memory.

At 1015, a message-out index counter for the shared memory is obtained. In some embodiments, the message-out index counter corresponds to the particular process seeking to offload the processing (e.g., a number of messages in the message-out index 664 of FIG. 6B). The message-index counter may be obtained from metadata associated with the process (e.g., the service). For example, the system obtains information for the message-out index counter (e.g., a value of the counter) from the shared memory system, such as the allocation at which metadata for the particular process is stored. The message-out index counter may indicate the number of request messages associated with the particular process that have been read by a process running on a message reader side of the shared memory (e.g., the WIFClient).

At 1020, the system determines whether the difference between the message-in index counter and the message-out index counter is greater than the allocated quota in the shared memory. For example, the system determines the allocated quota in the shared memory to be the total number of request messages that can be written to the shared memory multiplied by the percentage of the total shared memory that is allocated to (e.g., a quota is apportioned for) the particular process.

In response to determining that the system determines whether the difference between the message-in index counter and the message-out index counter is greater than the allocated quota in the shared memory, the system determines that the shared memory has sufficient capacity for the request message. For example, in response to determining that the difference between the message-in index counter and the message-out index counter is greater than the allocated quota in the shared memory at 1020, process 1000 proceeds to 1025 at which the system provides an indication that the shared memory has sufficient capacity for the request message. The indication may be provided to the process that invoked process 1000, such as 915 of process 900.

In response to determining that the system determines whether the difference between the message-in index counter and the message-out index counter is not greater than the allocated quota in the shared memory, the system determines that the shared memory does not have sufficient capacity for the request message. For example, in response to determining that the difference between the message-in index counter and the message-out index counter is not greater than the allocated quota in the shared memory at 1020, process 1000 proceeds to 1030 at which the system provides an indication that the shared memory does not have sufficient capacity for the request message. The indication may be provided to the process that invoked process 1000, such as 915 of process 900.

At 1035, a determination is made as to whether process 1000 is complete. In some embodiments, process 1000 is determined to be complete in response to a determination that no further data is to be offloaded to the cloud security entity (e.g., no traffic data is to be assessed with respect to a security analysis), no further data is to be analyzed (e.g., processed with respect to a security analysis), no further request messages are to be written to the shared memory, the process has terminated, an administrator indicates that process 1000 is to be paused or stopped, etc. In response to a determination that process 1000 is complete, process 1000 ends. In response to a determination that process 1000 is not complete, process 1000 returns to 1005.

FIG. 11 is a flow diagram of a method for obtaining feature vector(s) to train a machine learning model according to various embodiments. In some embodiments, process 1100 is implemented at least in part by system 100 of FIG. 1 and/or data appliance 102 of FIGS. 2A and 2B. Process 1000 may be implemented by an inline security entity, such as in connection with offloading processing data to a cloud security entity. In some embodiments, process 1100 is implemented by a second process (e.g., a daemon, the WIFClient, etc.) that connects to the cloud security entity and communicates a request message and result message with the cloud security entity. The second process may be implemented on a message reader side of the shared memory (e.g., the forward direction shared memory).

At 1105, an indication that the shared memory has a request message(s) pending is obtained. The second process (e.g., the WIFClient) may determine that the shared memory has pending request message(s) in response to polling the shared memory at a predefined periodic interval or may obtain the indication from a process that alerts the second process in response to a request message being stored in the shared memory.

At 1110, the request message is read from the shared memory.

At 1115, the request message is sent to the cloud security entity. For example, the WIFClient connects to the cloud security entity and forwards the request message to the cloud security entity. The WIFClient may send the request message to a file manager service running on the cloud security entity that routes request messages to the applicable cloud service.

At 1120, information pertaining to the message-out index is updated. In some embodiments, the system (e.g., the shared memory system, the process writing the request message, etc.) updates the message-out index to reflect the reading of the request message from the shared memory. As an example, the system updates (e.g., increments) a message-out index counter in connection with reading the request message from the shared memory. The message-out index may correspond to a particular process or quota for which the request message was written to the shared memory.

At 1125, a result for the offloaded processing is obtained. In some embodiments, the WIFClient receives the result message from the cloud security entity in response to cloud security entity completing the offloaded processing of the corresponding set of data.

At 1130, the result is provided to the corresponding process running on the message-reader side of the shared memory. For example, the result is provided to the process that wrote the corresponding request message to the shared memory. In some embodiments, providing the result to the corresponding process includes storing the result message in the shared memory system, such as in a reverse direction shared memory. The corresponding process may then obtain the result message from the shared memory system. For example, the process directly retrieves the result message such as by accessing the shared memory system and obtaining the result. As another example, the corresponding process obtains the result message from a process on the message writer side of the forward direction shared memory (e.g., the message reader side of a reverse direction shared memory), which in turn provides the result to the corresponding process.

At 1135, a determination is made as to whether process 1100 is complete. In some embodiments, process 1100 is determined to be complete in response to a determination that no further data is to be offloaded to the cloud security entity (e.g., no traffic data is to be assessed with respect to a security analysis), no further data is to be analyzed (e.g., processed with respect to a security analysis), no further request messages are to be written to the shared memory, the process has terminated, an administrator indicates that process 1100 is to be paused or stopped, etc. In response to a determination that process 1100 is complete, process 1100 ends. In response to a determination that process 1100 is not complete, process 1100 returns to 1105.

Figure 12:
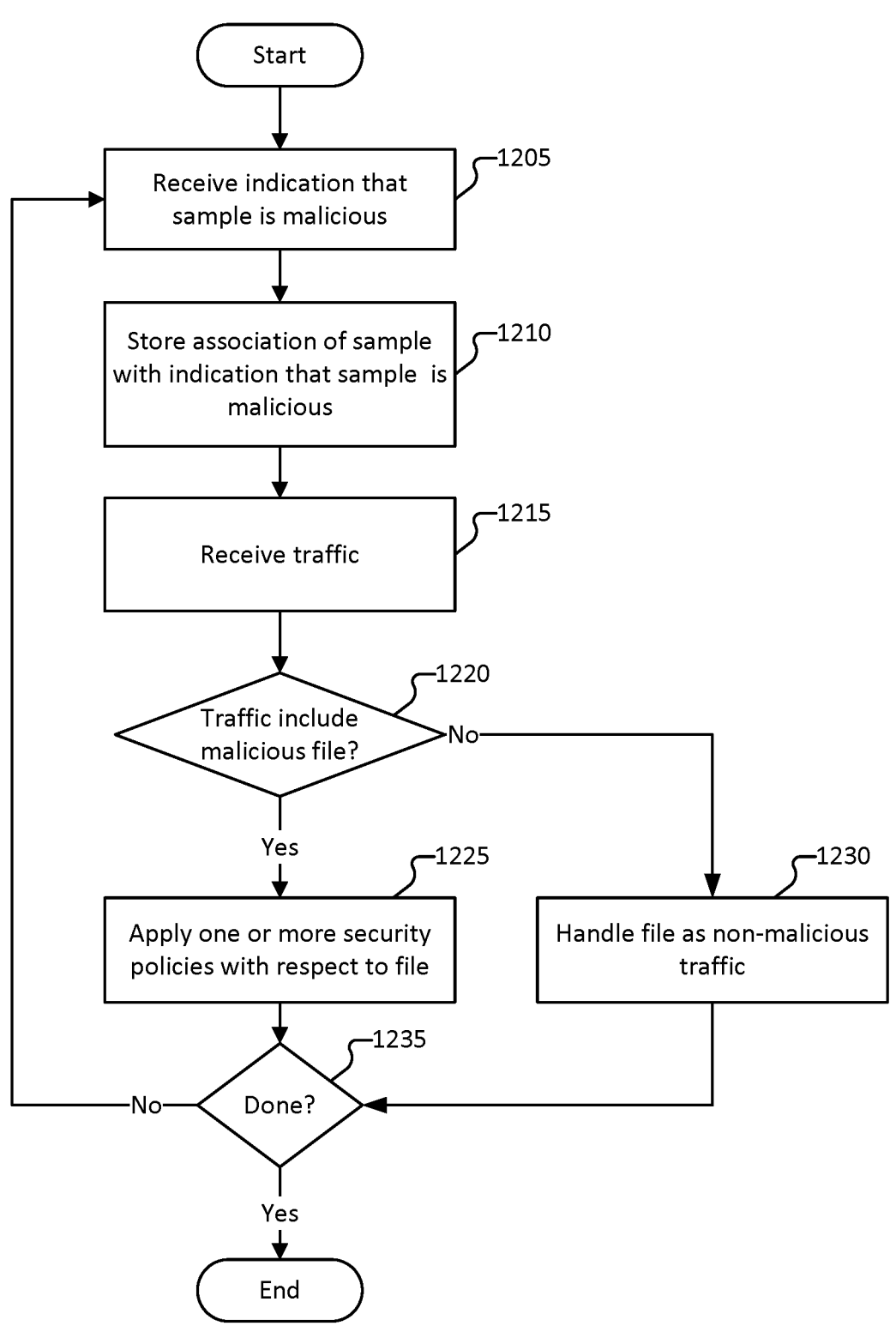
FIG. 12 is a flow diagram of a method for detecting a malicious file according to various embodiments.

FIG. 12 is a flow diagram of a method for detecting a malicious file according to various embodiments. In some embodiments, process 1100 is implemented at least in part by system 100 of FIG. 1 and/or data appliance 102 of FIGS. 2A and 2B. Process 1000 may be implemented by an inline security entity.

In some implementations, process 1200 may be implemented by one or more servers, such as in connection with providing a service to a network (e.g., a security entity and/or a network endpoint such as a client device). In some implementations, process 1200 may be implemented by a security entity (e.g., a firewall) such as in connection with enforcing a security policy with respect to files communicated across a network or in/out of the network. In some implementations, process 1200 may be implemented by a client device such as a laptop, a smartphone, a personal computer, etc., such as in connection with executing or opening a file such as an email attachment.

At 1205, an indication that the sample is malicious is received. In some embodiments, the system receives an indication that a sample is malicious, and the sample or hash, signature, or other unique identifier associated with the sample. For example, the system may receive the indication that the sample is malicious from a service such as a security or malware service. The system may receive the indication that the sample is malicious from one or more servers.

According to various embodiments, the indication that the sample is malicious is received in connection with an update to a set of previously identified malicious files. For example, the system receives the indication that the sample is malicious as an update to a blacklist of malicious files.

At 1210, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received files are malicious. In some embodiments, the identifier corresponding to the sample stored in association with the indication that the sample is malicious comprises a hash of the file (or part of the file), a signature of the file (or part of the file), or another unique identifier associated with the file.

At 1215, traffic is received. The system may obtain traffic such as in connection with routing traffic within/across a network, or mediating traffic into/out of a network such as a firewall, or a monitoring of email traffic or instant message traffic. The traffic may be obtained based on the inline security entity monitoring application traffic or network traffic.

At 1220, a determination of whether the traffic includes a malicious file is performed. In some embodiments, the system obtains the file from the received traffic. For example, the system identifies the file as an attachment to an email, identifies the file as being exchanged between two client devices via instant message program or other file exchange program, etc. In response to obtaining the file from the traffic, the system determines whether the file corresponds to a file comprised in a set of previously identified malicious files such as a blacklist of malicious files. In response to determining that the file is comprised in the set of files on the blacklist of malicious files, the system determines that the file is malicious (e.g., the system may further determine that the traffic includes the malicious file).

In some embodiments, the system determines whether the file corresponds to a file comprised in a set of previously identified benign files such as a whitelist of benign files. In response to determining that the file is comprised in the set of files on the whitelist of benign files, the system determines that the file is not malicious (e.g., the system may further determine that the traffic includes the malicious file).

According to various embodiments, in response to determining the file is not comprised in a set of previously identified malicious files (e.g., a blacklist of malicious files) or a set of previously identified benign files (e.g., a whitelist of benign files), the system deems the file as being non-malicious (e.g., benign).

According to various embodiments, in response to determining the file is not comprised in a set of previously identified malicious files (e.g., a blacklist of malicious files) or a set of previously identified benign files (e.g., a whitelist of benign files), the system queries a malicious file detector to determine whether the file is malicious. For example, the system may quarantine the file until the system receives response form the malicious file detector as to whether the file is malicious. The malicious file detector may perform an assessment of whether the file is malicious such as contemporaneous with the handling of the traffic by the system (e.g., in real-time with the query from the system). The malicious file detector may correspond to malicious sample detector 170 of system 100 of FIG. 1.

In some embodiments, the system determines whether the file is comprised in the set of previously identified malicious files or the set of previously identified benign files by computing a hash or determining a signature or other unique identifier associated with the file and performing a lookup in the set of previously identified malicious files or the set of previously identified benign files for a file matching the hash, signature or other unique identifier. Various hashing techniques may be implemented.

In response to a determination that the traffic does not include a malicious file at 1220, process 1200 proceeds to 1230 at which the file is handled as non-malicious traffic/information.

In response to a determination that the traffic does not include a malicious file at 1220, process 1200 proceeds to 1230 at which the file is handled as malicious traffic/information. The system may handle the malicious traffic/information based at least in part on one or more policies such as one or more security policies.

According to various embodiments, the handling of the file malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

At 1235, a determination is made as to whether process 1200 is complete. In some embodiments, process 1200 is determined to be complete in response to a determination that no further samples are to be analyzed (e.g., no further predictions for files are needed), an administrator indicates that process 1200 is to be paused or stopped, etc. In response to a determination that process 1200 is complete, process 1200 ends. In response to a determination that process 1200 is not complete, process 1200 returns to 1205.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing security processing at an inline security entity, comprising: one or more processors configured to: process a set of data for network security analysis;

determine whether to offload the set of data to a cloud security entity for security processing; and in response to determining to offload the set of data to the cloud security entity, send the set of data from a shared memory of the inline security entity to the cloud security entity, wherein: the inline security entity is an entity that intercepts or mediates network traffic between a source system and a destination system and is configured to compute an unread depth as a difference between a write index and a read index for each ring buffer and to block further writes when the unread depth exceeds a configured unread threshold;

the cloud security entity provides a plurality of first services for a plurality of second services running at the inline security entity;

the plurality of second services share a multiple-service shared-memory in which messages pertaining to the set of data offloaded to the cloud security entity is stored; and one or more of the plurality of second services is allocated a corresponding memory space quota of the multiple-service shared-memory; the multiple-service shared-memory comprises a plurality of ring buffers, each ring buffer dedicated to a corresponding one of the plurality of second services and bounded by the respective memory space quota a message written into the multiple-service shared-memory comprises a header including at least a service identifier, a correlation identifier, and a sequence number and a memory coupled to the one or more processors and configured to provide the one or more processors with instructions.

2. The system of claim 1, wherein the one or more processors are configured to read, from the multiple-service shared-memory, a result of the security processing from the cloud security entity.

3. The system of claim 1, wherein the set of data is sent from the shared memory of the inline security entity to the cloud entity by a data plane of the inline security entity.

4. The system of claim 3, wherein the data plane uses a connector service associated with the service or type of processing that is offloaded to the cloud security entity.

5. The system of claim 4, wherein the cloud security entity determines the service to which to assign the set of data based on the connector service used by the data plane to store the set of data to the multiple-service shared-memory.

6. The system of claim 1, wherein the inline security entity comprises a message writer that determines a usage of the multiple-service shared-memory.

7. The system of claim 6, wherein:
the inline security entity comprises a flow controller; and
in response to determining the usage of the multiple-service shared-memory, the message write provides an indication of current usage to the flow controller.

8. The system of claim 6, wherein in response to a determination that a number of unread messages in the multiple-service shared-memory exceeds a predefined message threshold, the message writer is prevented from writing a message to the multiple-service shared-memory.

9. The system of claim 6, wherein the usage of the multiple-service shared-memory based on a first number for a first index of written messages and a second number for a second index of read messages.

10. The system of claim 9, wherein the usage of the multiple-service shared-memory is determined with respect to a memory space quota allocated to a particular service.

11. The system of claim 10, wherein the usage of the multiple-service shared-memory for the particular service is determined based on a determination of whether a difference between the second number and the second number is greater than an allocated memory space quota for the particular service.

12. The system of claim 9, wherein the first index is incremented in response to a determination that a new message is written into the multiple-service shared-memory.

13. The system of claim 9, wherein the first index is incremented in response to a determination that a new message is read from the multiple-service shared-memory.

14. The system of claim 1, wherein in response to a determination that usage of the multiple-service shared-memory exceeds a usage threshold for a particular service, a flow controller implements an active measure with respect to a subsequent write message.

15. The system of claim 14, wherein the usage threshold corresponds to 80% of a memory space quota allocated for the particular service.

16. The system of claim 14, wherein the active measure is determined based on a configured behavior.

17. The system of claim 14, wherein the active measure is to block the particular service.

18. The system of claim 14, wherein the active measure is to not provide the particular service.

19. The system of claim 1, wherein one or more of the memory space quotas for the plurality of services are dynamically adjusted based on a usage of the corresponding services.

20. The system of claim 1, wherein the plurality of service comprises one or more of a data loss prevention (DLP) service, an Internet of Things (IOT) service, an application cloud engine (ACE) service, a URL category (URLCAT) service.

21. The system of claim 1, wherein the set of data offloaded to the cloud security entity is communicated to the cloud security entity by a service running on a same data plane as the multiple-service shared-memory.

22. The system of claim 1, wherein the inline security entity comprises a flow controller configured to compute an unread depth of the multiple-service shared memory as a modular difference between a write index and a read index, and to block writes when the unread depth exceeds a threshold.

23. The system of claim 1, wherein sending the set of data from the multiple-service shared memory to the cloud security entity comprises selecting a data-plane path using a connector service, and the cloud security entity determines a destination service based at least in part on metadata of the connector service.

24. A method for performing security processing at an inline security entity, comprising: processing, by one or more processors, a set of data for network security analysis; determining whether to offload the set of data to a cloud security entity for security processing; and in response to determining to offload the set of data to the cloud security entity, send the set of data from a shared memory of the inline security entity to the cloud security entity, wherein: the inline security entity is an entity that intercepts or mediates network traffic between a source system and a destination system and is configured to compute an unread depth as a difference between a write index and a read index for each ring buffer and to block further writes when the unread depth exceeds a configured unread threshold; the cloud security entity provides a plurality of services for a plurality of services running at the inline security entity; the plurality of services share a multiple-service shared-memory in which messages pertaining to the set of data offloaded to the cloud security entity is stored; and one or more of the plurality of services is allocated a memory space quota of the multiple-service shared-memory; the multiple-service shared-memory comprises a plurality of ring buffers, each ring buffer dedicated to a corresponding one of the plurality of second services and bounded by the respective memory space quota; a message written into the multiple-service shared-memory comprises a header including at least a service identifier, a correlation identifier, and a sequence number.

25. A computer program product embodied in a non-transitory computer readable medium for performing security processing at an inline security entity, and the computer program product comprising computer instructions for: processing, by one or more processors, a set of data for network security analysis; determining whether to offload the set of data to a cloud security entity for security processing; and in response to determining to offload the set of data to the cloud security entity, send the set of data from a shared memory of the inline security entity to the cloud security entity, wherein: the inline security entity is an entity that intercepts or mediates network traffic between a source system and a destination system and is configured to compute an unread depth as a difference between a write index and a read index for each ring buffer and to block further writes when the unread depth exceeds a configured unread threshold; the cloud security entity provides a plurality of first services for a plurality of second services running at the inline security entity; the plurality of second services share a multiple-service shared-memory in which messages pertaining to the set of data offloaded to the cloud security entity is stored; and one or more of the plurality of second services is allocated a memory space quota of the multiple-service shared-memory; the multiple-service shared-memory comprises a plurality of ring buffers, each ring buffer dedicated to a corresponding one of the plurality of second services and bounded by the respective memory space quota; a message written into the multiple-service shared-memory comprises a header including at least a service identifier, a correlation identifier, and a sequence number.

* * * * *